(12) United States Patent
Nakagawa et al.

(10) Patent No.: US 9,392,537 B2
(45) Date of Patent: Jul. 12, 2016

(54) TERMINAL AND CONNECTION METHOD FOR SAME

(71) Applicant: SOFTBANK MOBILE CORP., Tokyo (JP)

(72) Inventors: Yoshinobu Nakagawa, Tokyo (JP); Masayuki Doi, Tokyo (JP); Masayoshi Hosoi, Tokyo (JP); Akifumi Kamada, Tokyo (JP); Yasuhiro Noda, Tokyo (JP); Hitoshi Tsuchiya, Tokyo (JP); Takafumi Okaniwa, Tokyo (JP); Younpyo Hong, Tokyo (JP)

(73) Assignee: SOFTBANK CORP., Minato-Ku (JP)

( * ) Notice: Subject to any disclaimer, the term of this patent is extended or adjusted under 35 U.S.C. 154(b) by 0 days.

(21) Appl. No.: 14/411,890

(22) PCT Filed: Apr. 9, 2013

(86) PCT No.: PCT/JP2013/060742
§ 371 (c)(1),
(2) Date: Dec. 29, 2014

(87) PCT Pub. No.: WO2014/006949
PCT Pub. Date: Jan. 9, 2014

(65) Prior Publication Data
US 2015/0173002 A1    Jun. 18, 2015

(30) Foreign Application Priority Data

| Jul. 4, 2012 | (JP) | 2012-150449 |
| Jul. 5, 2012 | (JP) | 2012-151436 |
| Sep. 28, 2012 | (JP) | 2012-217195 |

(51) Int. Cl.
*H04W 48/00* (2009.01)
*H04W 48/16* (2009.01)
*H04W 48/20* (2009.01)

(52) U.S. Cl.
CPC .............. *H04W 48/16* (2013.01); *H04W 48/20* (2013.01)

(58) Field of Classification Search
None
See application file for complete search history.

(56) References Cited

U.S. PATENT DOCUMENTS

2007/0180448 A1* 8/2007 Low .................... G06F 3/1415
                                                          718/1
2009/0270117 A1    10/2009 Buckley
(Continued)

FOREIGN PATENT DOCUMENTS

| JP | 2008-79079 | 4/2008 |
| JP | 2010-34901 | 2/2010 |

(Continued)

OTHER PUBLICATIONS

Office action mailed Mar. 5, 2013 in corresponding Japanese Patent Application No. 2012-217195, 7pp including English translation.
(Continued)

*Primary Examiner* — Diane Mizrahi
(74) *Attorney, Agent, or Firm* — Lewis Roca Rothgerber Christie LLP

(57) ABSTRACT

The terminal according to the present application has a connection unit that connects to an access point for a communication network The terminal also has a connection control unit that scans a network registered in a connection list, subtracts access points registered in a exclusion list from the detected access points to identify access points to which connection is possible, initializes the exclusion list if an access point to which connection is possible is not identified and then again identifies an access point to which connection is possible, and selects an access point to connect to, out of identified access points to which connection in possible. The terminal further has a connection ending unit that, if the start of a connection to an access point registered in a duplicate exclusion list is detected, cuts the connection with the access point, and also deletes the corresponding network from the connection list.

11 Claims, 17 Drawing Sheets

(56) References Cited

U.S. PATENT DOCUMENTS

| | | | | |
|---|---|---|---|---|
| 2013/0128815 A1* | 5/2013 | Scherzer | ............... | H04W 72/00 370/328 |
| 2013/0294441 A1* | 11/2013 | Welin | ....................... | G10L 25/78 370/352 |
| 2014/0293980 A1* | 10/2014 | Shibata | ................. | H04W 88/06 370/338 |
| 2014/0357234 A1* | 12/2014 | Sullivan | ................. | H04W 4/06 455/412.1 |

FOREIGN PATENT DOCUMENTS

| | | |
|---|---|---|
| JP | 2011-49701 | 3/2011 |
| JP | 2011-523250 | 8/2011 |
| JP | 2012-175686 | 9/2012 |
| JP | 2012-175686 A | 9/2012 |

OTHER PUBLICATIONS

Office action mailed Mar. 12, 2013 in corresponding Japanese Patent Application No. 2012-151436, 5pp including English translation.

International Search Report of corresponding PCT/JP2013/060742, dated Jun. 18, 2013, 4 pages.

* cited by examiner

TERMINAL AND CONNECTION METHOD FOR SAME

CROSS-REFERENCE TO RELATED APPLICATION(S)

This application is a National Phase Patent Application and claims priority to and the benefit of International Application Number PCT/JP2013/060742, filed on Apr. 9, 2013, which claims priority to Japanese Patent Application Number 2012-150449, filed on Jul. 4, 2012, Japanese Patent Application Number 2012-151436, filed on Jul. 5, 2012, and Japanese Patent Application Number 2012-217195, filed on Sep. 28, 2012, the entire disclosures of which are incorporated herein by reference.

TECHNICAL FIELD

Embodiments discussed in the present specification relate to a terminal which is capable of connecting to a communication network, and a method for connecting the terminal.

BACKGROUND

In recent years, portable terminals which are capable of connecting to a plurality of heterogeneous communication networks, such as a mobile phone network and a wireless local area network (LAN), as a standard function have come to be widely utilized. With such a portable terminal, communication can be continuously performed among the plurality of communication networks, by properly switching the communication network (communication channel) to be connected or utilized (hereinafter referred to as "handover").

Regarding the technique related to the handover among the plurality of communication networks, Patent Literature 1 discloses a technique that enables the handover to be stably performed between the mobile phone network and the wireless LAN, without interrupting data communication. According to the cited document, the communication network is switched to the wireless LAN when the reception level of the wireless LAN continuously exceeds a threshold for a predetermined period of time while the terminal is connected to the mobile phone network, and the communication network is switched to the mobile phone network when the reception level of the wireless LAN remains below the threshold for a predetermined period of time while the terminal is connected to the wireless LAN. In addition, the traffic during the communication is monitored, and the communication network is switched between the mobile phone network and the wireless LAN when the traffic is continuously suspended for a predetermined period of time.

With the conventional technique cited above, generally, once the connection is established at the communication network level, the communication network is switched irrespective of whether the connection has been completed at the application level. The communication network level refers to, for example, a transport layer or lower layers and the application level refers to an application layer, in the protocol stack of the transmission control protocol/internet protocol (TCP/IP). Accordingly, such a case may arise that the connection has not been completed at the application level despite the connection having been completed at the communication network level, and hence the application is unable to make communication until the connection is completed at the application level, or until switching to the communication network connected thus far or reconnection is completed after the failure in connection at the application level. Such a situation will be described in further detail, with respect to the case of switching the communication network from the mobile phone network to the wireless LAN, as an example.

When the portable terminal, which is already connected to the mobile phone network, attempts to connect to a backbone network via an access point and then to the internet or the like via a gateway, a predetermined procedure referred to as "association at network level" is performed between the portable terminal and the access point so as to allow the access point to recognize the presence of the portable terminal, in the wireless communication system based on Institute of Electrical and Electronics Engineers (IEEE) 802.11 Standard.

It is also a common practice that a procedure referred to as "authentication at application level" (for example, web authentication) is performed between the portable terminal and the gateway so as to allow the gateway to identify the user, so that only the portable terminal of the identified user is connected to the internet or the like.

FIG. 17 is a chart showing an operation sequence of the conventional wireless LAN communication system.

The portable terminal acquires from a target list an extended service set identifier (ESSID) of the network to which a connection is attempted, and broadcasts a probe request including the ESSID (step S1700).

The access point returns a probe response when the ESSID in the received probe request is the same as its own ESSID or "ANY" (step S1702). The probe response includes parameters such as a basic service set identifier (BSSID), an encryption method, an authentication method, and a communication rate of the access point.

When the portable terminal fails to receive the probe response, the portable terminal broadcast a probe request including another ESSID (step S1700).

Upon receipt of the probe response, the portable terminal determines whether the BSSID included in the probe response is registered in an exclusion list. When the BSSID is registered in the exclusion list, the portable terminal broadcast a probe request including still another ESSID (step S1700).

When the access point is not identified through the mentioned procedure, the portable terminal initializes the exclusion list (deletes the registered BSSID), and then repeats the mentioned procedure.

When the BSSID is not registered in the exclusion list, the portable terminal transmits an authentication request to the access point (step S1704).

The access point determines whether the portable terminal may be authenticated using a predetermined algorithm, and returns an authentication response including the decision (step S1706). Generally, the authentication is performed using the media access control (MAC) address of the portable terminal as an identifier.

Upon confirming the authentication by the access point, the portable terminal transmits an association (connection) request to the access point (step S1708). The association request includes parameters such as the ESSID, a support report, and whether or not polling is necessary.

The access point returns an association response, upon confirming that the MAC address is the authenticated one and that all the parameters in the received association request correspond to the access point (step S1710).

When the connection is established at the communication network level and the communication network is switched from the mobile phone network to the wireless LAN through the procedure described above, the portable terminal is enabled to connect to the backbone network via the access point and transmits a data frame. At this point, however, the user has not been authenticated by the gateway and the connection has not been completed at the application level, and therefore the portable terminal is unable to achieve connection to the internet or the like via the gateway. At this point, the connection to the mobile phone network may or may not be disconnected.

The portable terminal transmits a page acquisition request including the uniform resource locator (URL) of the log-in page, to the gateway (step S1712).

The gateway returns the page corresponding to the URL in the page acquisition request, i.e., the log-in page (step S1714).

The portable terminal transmits the authentication request to the gateway (step S1716). The authentication request includes parameters such as the identification (ID) number of the user and a password. Such data may be automatically extracted from a setup file or manually inputted by the user.

The gateway transfers the received authentication request to an authentication server (step S1718).

The authentication server determines whether the user may be authenticated on the basis of the ID and the password in the received authentication request, and returns the authentication response including the decision (step S1720).

The gateway transfers the received authentication response to the portable terminal (step S1722).

When the user is authenticated by the gateway and the connection is completed at the application level through the mentioned procedure, the portable terminal is enabled to connect to the internet or the like via the gateway, and transmit the connection request to the server (step S1724).

CITATION LIST

Patent Literature

Patent Literature 1: Japanese Laid-open Patent Publication No. 2012-004659

SUMMARY

Technical Problem

With the conventional technique, convenience to users may be significantly impaired, as represented by the foregoing situation.

Accordingly, it is an object of the disclosed terminal and connection method for connecting the terminal that provide a solution to the problems incidental to the conventional technique.

Solution to Problem

According to an aspect of the terminal, there is provided a terminal which is capable of connecting to a communication network. The terminal includes a communication module for connecting to an access point of the communication network, a storage for storing a target list including networks to be connected, an exclusion list including an access point to be excluded from connection targets, and a duplicate exclusion list being a reproduction of the exclusion list, a connection controller for scanning the network registered in the target list, excluding the access point registered in the exclusion list from the detected access points so as to identify the access points to which a connection may be made, and a connection completion module for cutting off the connection to the access point and deleting the corresponding network from the target list, when it is detected that the connection to the access point registered in the duplicate exclusion list is started, wherein the connection controller identifies again the access points to which a connection may be made after initializing the exclusion list, when the access point to which a connection may be made is unable to be identified, and designating one of the identified access points to which a connection may be made as a target of the connection.

According to an aspect of the terminal, the connection completion module scans a given network, and registers a deleted network in the target list when the access point registered in the duplicate exclusion list is not detected.

According to an aspect of the terminal, the connection completion module does not scan a given network during a predetermined period of time when the deleted network is a predetermined network.

According to an aspect of the terminal, the terminal further includes a timer module for measuring time, wherein the connection completion module performs communication with the communication network a plurality of times so as to complete the connection to the communication network at an application level, causes the timer module to start clocking upon starting the connection to the communication network at the application level, and cuts off the connection to the access point upon determining, on the basis of the clocking of the timer module, that a predetermined timeout period has elapsed before completing the connection to the communication network at the application level.

According to an aspect of the terminal, the predetermined timeout period is specified according to the network which the access point in the communication network to which a connection has been established belongs to.

According to an aspect of the terminal, the terminal further includes a second communication module for connecting to a second communication network of a different type from the communication network, wherein the connection completion module completes connection to the communication network at an application level, and in cases in which connection to the second communication network is already completed, the connection controller notifies the connection completion module to the effect that the connection to the communication network has been established when such connection is established, and switches the network for communication from the second communication network to the communication network, upon receipt of a notice of completion of the connection to the communication network, from the connection completion module.

According to an aspect of the terminal, the storage further stores an access point which is a switching delay target, out of the access points in the communication network, and the connection controller immediately switches the network for communication from the second communication network to the communication network, when the access point of the communication network to which a connection is established is not the access point which is a switching delay target.

According to an aspect of the terminal, the connection controller allows communication with a server for completing the connection to the communication network to be performed through the communication network, in accordance with a request from the connection completion module.

According to an aspect of the terminal, the server performs user authentication of the terminal, and the connection to the communication network is completed when the user authentication by the server is completed.

According to an aspect of the connection method, there is provided a connection method to be executed by a terminal which is capable of connecting to a communication network, the terminal including a storage for storing a target list including networks to be connected, an exclusion list including an access point to be excluded from connection targets, and a duplicate exclusion list being a reproduction of the exclusion list. The method includes scanning a network registered in the target list, excluding the access point registered in the exclusion list from the detected access points so as to identify the access points to which a connection may be made, identifying again the access points to which a connection may be made after initializing the exclusion list, when the access point to which a connection may be made is unable to be identified, designating one of the identified access points to which a connection may be made as a target of the connection, and cutting off the connection to the access point and deleting the corresponding network from the target list, when it is detected that the connection to the access point registered in the duplicate exclusion list is started.

Advantageous Effects of Invention

The terminal and the connection method for connecting the terminal according provide solutions to the problems incidental to the conventional technique.

DESCRIPTION OF EMBODIMENTS

Various embodiments will be explained below with reference to the drawings. However, it should be noted that the technical scope of this application is not limited to the embodiments but includes the invention as defined by the claims and equivalents thereof.

(First Embodiment)

With the conventional technique, such a case may arise that the connection has not been completed at the application level despite the connection having been completed at the communication network level, and hence the application is unable to make communication until the connection or the like is completed at the application level. Therefore, convenience to users may be significantly impaired.

Accordingly, this embodiment attempts to eliminate an interruption period incidental to the switching of the communication network. To be more specific, in this embodiment a portable terminal is already connected to the mobile phone network and such a portable terminal attempts to make connection to the internet via a wireless LAN. In this process, the portable terminal obtains web authentication from a gateway, with respect to a predetermined access point. Only after the web authentication has succeeded (been completed), the portable terminal assumes that the connection to the wireless LAN has been established, and switches the communication network from the mobile phone network to the wireless LAN.

Figure 1:
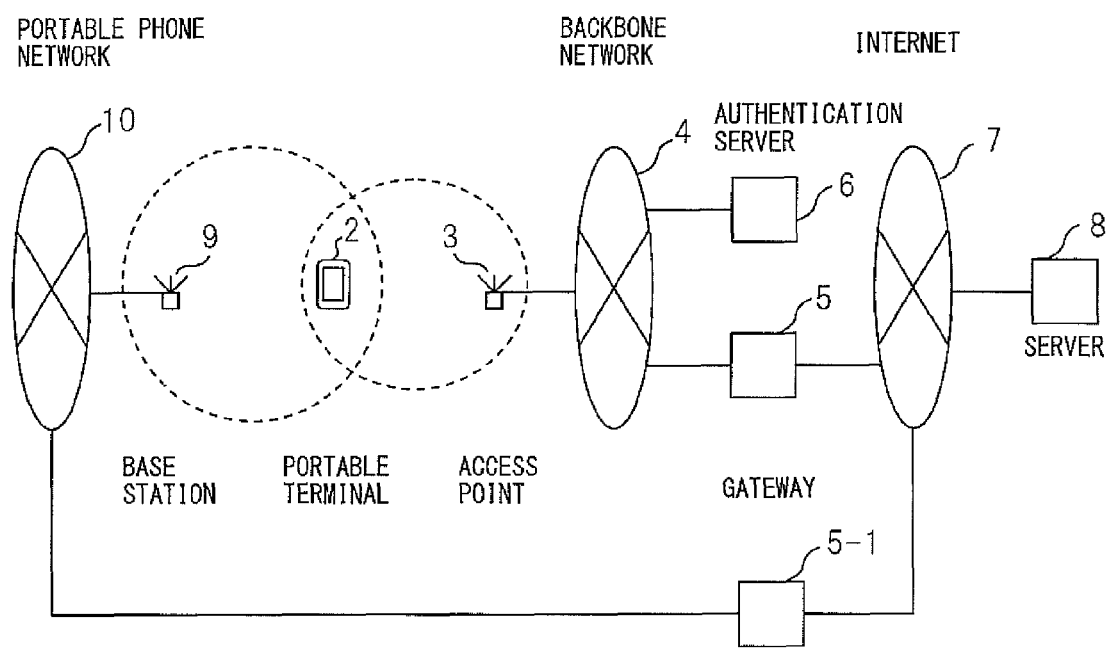
FIG. 1 is a view illustrating an example of the schematic configuration of a wireless communication system.

FIG. 1 is a view illustrating an example of the schematic configuration of a wireless communication system 1.

The wireless communication system 1 includes a portable terminal 2 capable of making connection to the wireless LAN and the mobile phone network, an access point 3 of the wireless LAN, and a base station 9 of the mobile phone network. The portable terminal 2 is capable of performing wireless communication with the access point 3 and the base station 9 within their service area.

The access point 3 is connected to a backbone network 4. A gateway 5 intermediating between the backbone network 4 and the internet 7, and an authentication server 6 that authenticates users are connected to the backbone network 4, via a wired LAN such as Ethernet (registered trademark).

The portable terminal 2 can be connected to the internet 7 via the gateway 5, when the user is authenticated by the authentication server 6 through the gateway 5. Accordingly, the portable terminal 2 can communicate with a server 8 connected to the internet 7.

The base station 9 is connected to the mobile phone network 10. A gateway 5-1 intermediating between the mobile phone network 10 and the internet 7 is connected to the mobile phone network 10.

The portable terminal 2 can also be connected to the internet 7 via the gateway 5-1. Accordingly, the portable terminal 2 can communicate with the server 8 connected to the internet 7.

Figure 2:
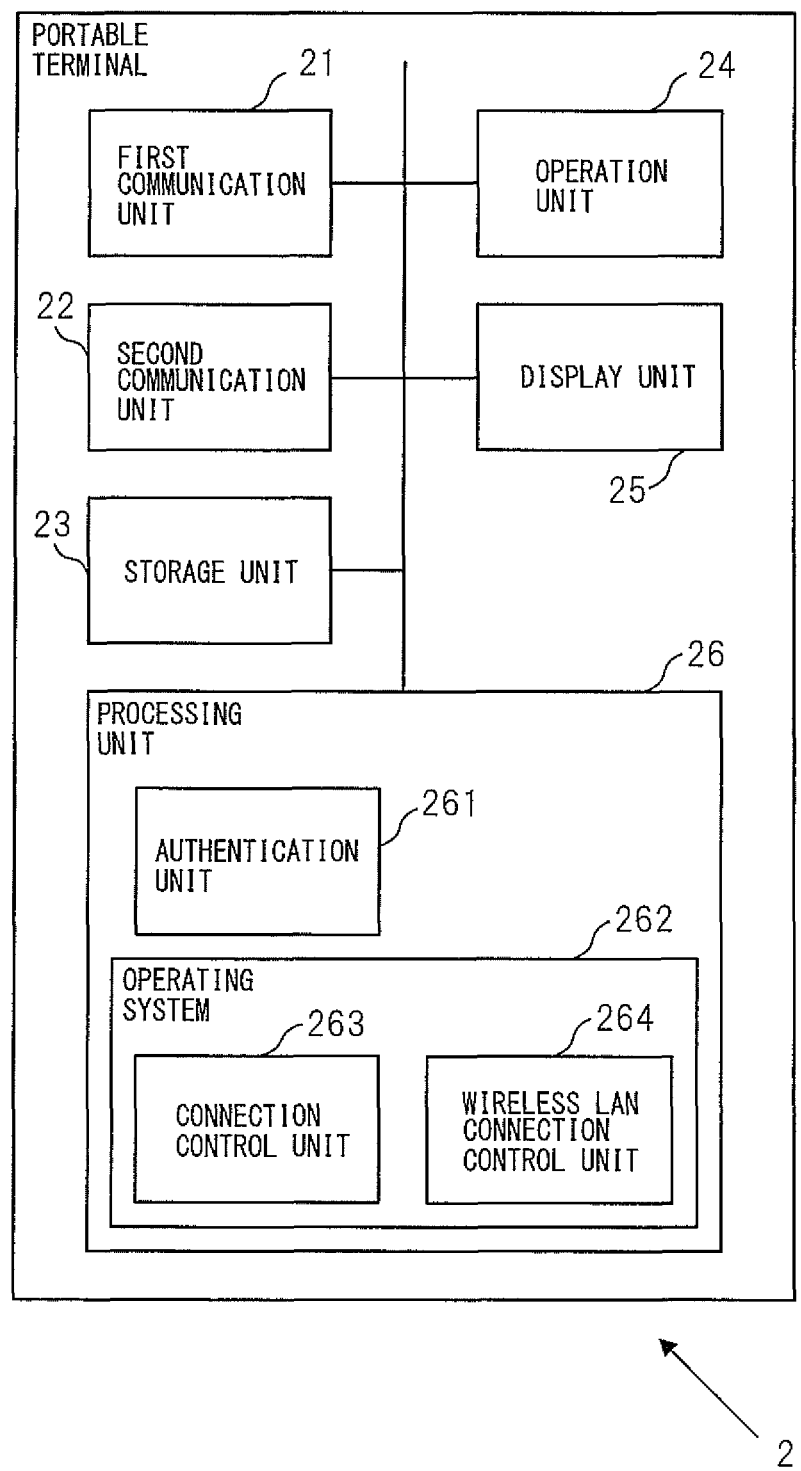
FIG. 2 is a view illustrating an example of the schematic configuration of a portable terminal.

FIG. 2 is a view illustrating an example of the schematic configuration of the portable terminal 2.

The portable terminal 2 makes connection to the server 8 via the access point 3, the backbone network 4, the gateway 5, and the internet 7, or via the base station 9, the mobile phone network 10, the gateway 5-1, and the internet 7, and communicates with the server 8. For such purpose, the portable terminal 2 includes a first communication unit 21, a second communication unit 22, a storage unit 23, an operation unit 24, a display unit 25, and a processing unit 26.

The first communication unit 21 includes a communication interface circuit including an antenna mainly sensitive to a 2.4 GHz band, and serves to connect the portable terminal 2 to the backbone network 4. The first communication unit 21 establishes a wireless communication line with the access point 3 based on the wireless communication method according to IEEE 802.11 Standard, to thereby communicate with the access point 3. The first communication unit 21 provides data received from the access point 3 to the processing unit 26. The first communication unit 21 also transmits data provided from the processing unit 26 to the access point 3.

The second communication unit 22 includes a communication interface circuit including an antenna mainly sensitive to a 2 GHz band, and serves to connect the portable terminal 2 to the mobile phone network 10. The second communication unit 22 establishes a wireless signal line with the base station 9 according to the code division multiple access (CDMA) method or the like, through a channel assigned by the base station 9, to thereby communicate with the base station 9. The second communication unit 22 provides data received from the base station 9 to the processing unit 26. The second communication unit 22 also transmits data provided from the processing unit 26 to the base station 9.

The storage unit 23 includes at least one of, for example, a semiconductor memory, a magnetic disk device, and an optical disk device. The storage unit 23 stores therein a driver program, an operating system program, an application program, data, and the like used for the processing in the processing unit 26. Examples of the driver program stored in the storage unit 23 include an input device driver program for controlling the operation unit 24, and an output device driver program for controlling the display unit 25. An example of the operating system program stored in the storage unit 23 is a connection control program for executing the wireless communication based on IEEE 802.11 Standard. Examples of the application program stored in the storage unit 23 include an authentication program for executing web authentication, a web browser program for acquiring and displaying web pages, and an e-mail program for transmitting and receiving e-mails. Examples of the data stored in the storage unit 23 include a target list including the ESSID of the network to be connected, an exclusion list including the BSSID of an excluded access point 3, the BSSID of the access point 3 to which a connection is in process or already completed and the ESSID corresponding thereto, the ESSID of the network to be authenticated, a setup file including details of settings regarding the network connection, picture data, and image data. The storage unit 23 may also temporarily store transitory data related to a predetermined process.

The operation unit 24 may be constituted of any device provided that the device is capable of operating the portable terminal 2, and is typically exemplified by a touch pad and a keyboard. The user can input characters, numerals, or the like through the device. The operation unit 24 generates, upon being operated by the user, a signal corresponding to the operation. The signal thus generated is inputted to the processing unit 26 as an instruction of the user.

The display unit 25 may also be constituted of any device provided that the device is capable of displaying pictures, images, or the like and is typically exemplified by a liquid crystal display and an organic electro-luminescence (EL) display. The display unit 25 displays pictures corresponding to the picture data provided from the processing unit 26, and images or the like corresponding to the image data provided therefrom.

The processing unit 26 includes one or a plurality of processors, and peripheral circuits thereof. The processing unit 26 performs centralized control of the overall operation of the portable terminal 2, and is constituted of, for example, a central processing unit (CPU). More specifically, the processing unit 26 controls the operation of the first communication unit 21, the second communication unit 22, the display unit 25, or the like, so as to allow the processes of the portable terminal 2 to be executed through appropriate procedures in accordance with the programs stored in the storage unit 23, the instructions from the operation unit 24, or the like. The processing unit 26 executes the processes in accordance with the programs stored in the storage unit 23 (driver program, operating system program, application program, and so forth). The processing unit 26 is capable of executing a plurality of programs (for example, application programs) in parallel.

The processing unit 26 includes an authentication unit 261, an operating system 262, a connection control unit 263, and a wireless LAN connection control unit 264. These units are functional modules implemented by the program executed on the processor in the processing unit 26. Alternatively, the cited units may be implemented in the portable terminal 2 in the form of firmware.

The authentication unit 261 notifies the ESSID of the network to be authenticated, to the connection control unit 263. The authentication unit 261 also notifies the start and finish of the web authentication to the connection control unit 263. In addition, the authentication unit 261 executes web authentication with the gateway 5. Details of such operations will be subsequently described.

The operating system 262 realizes basic functions utilized in common by the applications and controls the overall operation of the portable terminal 2, and is typically exemplified by Android (registered trademark) OS and iOS (registered trademark). The operating system 262 relays the notices related to the web authentication between the authentication unit 261 and the connection control unit 263.

The connection control unit 263 switches the communication network between the mobile phone network 10 and the wireless LAN. The connection control unit 263 also sets a communication channel for a predetermined internet protocol (IP) address. Details of such operations will be subsequently described.

The wireless LAN connection control unit 264 executes the wireless communication in compliance with IEEE 802.11 Standard. The wireless LAN connection control unit 264 also notifies start and establishment of the connection to the access point 3, to the authentication unit 261 and the connection control unit 263. Further, the wireless LAN connection control unit 264 cuts off the connection to the access point 3. Details of such operations will be subsequently described.

Hereinafter, the operation of the wireless LAN connection control unit 264 will be described.

Upon detecting that connection to the wireless LAN has been turned ON, the wireless LAN connection control unit 264 acquires an ESSID from the target list stored in the storage unit 23, and broadcasts a probe request including the acquired ESSID through the first communication unit 21.

When a probe response is not received from the access point 3 through the first communication unit 21, the wireless LAN connection control unit 264 acquires another ESSID from the target list stored in the storage unit 23, and broadcasts the probe request including the acquired ESSID through the first communication unit 21. On the other hand, when the probe response is received from the access point 3 through the first communication unit 21, the wireless LAN connection control unit 264 determines whether the BSSID included in the received probe response is registered in the exclusion list stored in the storage unit 23. When the BSSID is registered in the exclusion list, the wireless LAN connection control unit 264 acquires still another ESSID from the target list stored in the storage unit 23, and broadcasts the probe request including the acquired ESSID through the first communication unit 21. When the access point 3 is not identified through the mentioned procedure, the wireless LAN connection control unit 264 repeats the same procedure after initializing the exclusion list. On the other hand, when the BSSID is not registered in the exclusion list, the BSSID and the corresponding ESSID are stored in the storage unit 23. The wireless LAN connection control unit 264 transmits an authentication request to the access point 3 through the first communication unit 21. The wireless LAN connection control unit 264 also notifies the authentication unit 261 and the connection control unit 263 to the effect that connection to the access point 3 has been started.

Upon receipt of an authentication response from the access point 3 through the first communication unit 21, the wireless LAN connection control unit 264 confirms the authentication of the access point 3 and then transmits an association request to the access point 3 through the first communication unit 21. The wireless LAN connection control unit 264 then notifies, upon receipt of an association response from the access point 3 through the first communication unit 21, the authentication unit 261 and the connection control unit 263 to the effect that connection to the access point 3 has been established.

When a request for disconnection from access point 3 is received from the connection control unit 263, the wireless LAN connection control unit 264 cuts off the connection to the access point 3, which is in process or already completed.

Hereinafter, the operation of the connection control unit 263 will be described.

When the authentication unit 261 requests setting of the network to be authenticated using the ESSID or the like as parameter, the connection control unit 263 stores the received ESSID in the storage unit 23.

Upon receipt of the notice from the wireless LAN connection control unit 264 to the effect that the connection to the access point 3 has been established, the connection control unit 263 acquires the ESSID of the access point 3 to which a connection is in process or already completed, from the storage unit 23. The connection control unit 263 also looks up the ESSID of the network to be authenticated stored in the storage unit 23, and determines whether the acquired ESSID is included. When the acquired ESSID is not included, the connection control unit 263 switches the communication network from the mobile phone network 10 to the wireless LAN. When the acquired ESSID is included, the connection control unit 263 continues with the current process.

Upon receipt of the notice from the authentication unit 261 to the effect that the web authentication is started, the connection control unit 263 allows the authentication unit 261 to communicate with a non-illustrated domain name system (DNS) server through the wireless LAN.

When the authentication unit 261 requests setting of a communication channel using the IP address or the like as parameter, the connection control unit 263 sets a channel that allows the authentication unit 261 to communicate with the host of the received IP address through the wireless LAN.

Upon receipt of the notice from the authentication unit 261 to the effect that the web authentication has been finished, with the authentication result or the like as parameter, the connection control unit 263 allows the authentication unit 261 to communicate with the non-illustrated DNS server through a default communication channel (mobile phone network 10).

The connection control unit 263 determines whether the web authentication is successful (completed), on the basis of the received authentication result. When the web authentication is successful, the connection control unit 263 switches the communication network from the mobile phone network 10 to the wireless LAN. When the web authentication fails, the connection control unit 263 requests the wireless LAN connection control unit 264 to cut off the connection to the access point 3. Accordingly, the mobile phone network 10 is continuously used as the communication network.

Hereinafter, the operation of the authentication unit 261 will be described.

Upon detecting that the switching delay mode has been turned ON, the authentication unit 261 looks up the setup file stored in the storage unit 23, and extracts the ESSID of the network to be authenticated. The authentication unit 261 also requests the connection control unit 263 to set the network to be authenticated using the extracted ESSID or the like as parameter.

Upon receipt of the notice from the wireless LAN connection control unit 264 to the effect that the connection to the access point 3 has been established, the authentication unit 261 notifies the connection control unit 263 to the effect that the web authentication is started.

The authentication unit 261 looks up the setup file stored in the storage unit 23, and extracts the IP address of the gateway 5. Alternatively, the authentication unit 261 may look up the setup file stored in the storage unit 23 so as to extract the URL of the gateway 5, and make an inquiry to the non-illustrated DNS server through the first communication unit 21, thus acquiring the corresponding IP address. The authentication unit 261 then requests the connection control unit 263 to set the communication channel, using the extracted or acquired IP address or the like as parameter.

The authentication unit 261 transmits a page acquisition request including the URL of the log-in page to the gateway 5 through the first communication unit 21.

Upon receipt of the log-in page from the gateway 5 through the first communication unit 21, the authentication unit 261 looks up the setup file stored in the storage unit 23, to thereby extract the user ID and the password. The authentication unit 261 then transmits the authentication request including the extracted ID and password to the gateway 5 through the first communication unit 21.

Upon receipt of the authentication response from the gateway 5 through the first communication unit 21, the authentication unit 261 extracts the authentication result from the received authentication response, and notifies the connection control unit 263 to the effect that the web authentication has been finished, using the extracted authentication result or the like as parameter.

Figure 3:
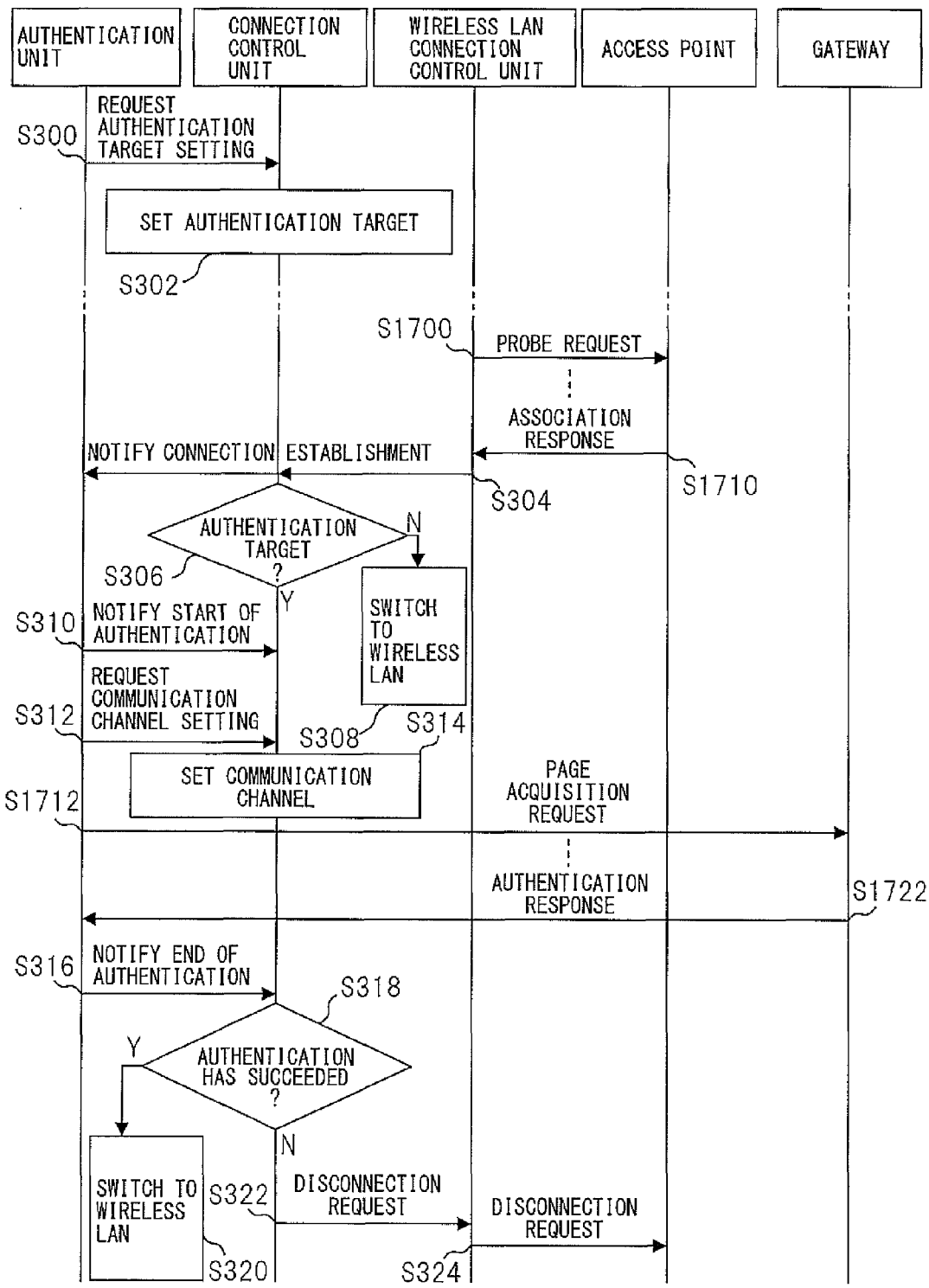
FIG. 3 is a view indicating an example of the operation sequence of the wireless communication system.

FIG. 3 is a view indicating an example of the operation sequence of the wireless communication system 1. The operation sequence described Hereinafter is performed primarily by the processing unit 26 or the like in collaboration with the portable terminal 2, the access point 3, and the gateway 5, on the basis of the programs stored in advance in the storage unit 23 or the like. Out of the following operation sequence, steps S1702 to 1710, and steps 1714 to 1724 are the same as those included in FIG. 17, and therefore the description of those steps will not be repeated.

Upon detecting that the switching delay mode has been turned ON, the authentication unit 261 looks up the setup file stored in the storage unit 23, and extracts the ESSID of the network to be authenticated. The authentication unit 261 also requests the connection control unit 263 to set the network to be authenticated using the extracted ESSID or the like as parameter (step S300).

When the authentication unit 261 requests setting of the network to be authenticated using the ESSID or the like as parameter, the connection control unit 263 stores the received ESSID in the storage unit 23 (step S302).

Upon detecting that connection to the wireless LAN has been turned ON, the wireless LAN connection control unit 264 acquires an ESSID from the target list stored in the storage unit 23, and broadcasts the probe request including the acquired ESSID through the first communication unit 21 (step S1700).

Upon receipt of the association response from the access point 3 through the first communication unit 21, the wireless LAN connection control unit 264 notifies the authentication unit 261 and the connection control unit 263 to the effect that connection to the access point 3 has been established (step S304).

Upon receipt of the notice from the wireless LAN connection control unit 264 to the effect that the connection to the access point 3 has been established, the connection control unit 263 acquires the ESSID of the access point 3 to which a connection is in process or already completed, from the storage unit 23. The connection control unit 263 also looks up the ESSID of the network to be authenticated stored in the storage unit 23, and determines whether the acquired ESSID is included (step S306).

When the acquired ESSID is not included (No at step S306), the connection control unit 263 switches the communication network from the mobile phone network 10 to the wireless LAN (step S308).

When the acquired ESSID is included (Yes at step S306), the connection control unit 263 continues with the current process.

Upon receipt of the notice from the wireless LAN connection control unit 264 to the effect that the connection to the access point 3 has been established, the authentication unit 261 notifies the connection control unit 263 to the effect that the web authentication is started (step S310).

Upon receipt of the notice from the authentication unit 261 to the effect that the web authentication is started, the connection control unit 263 allows the authentication unit 261 to communicate with the non-illustrated DNS server through the wireless LAN.

The authentication unit 261 looks up the setup file stored in the storage unit 23, and extracts the IP address of the gateway 5. Alternatively, the authentication unit 261 may look up the setup file stored in the storage unit 23 so as to extract the URL of the gateway 5, and make an inquiry to the non-illustrated DNS server through the first communication unit 21, thus acquiring the corresponding IP address. The authentication unit 261 then requests the connection control unit 263 to set the communication channel, using the extracted or acquired IP address or the like as parameter (step S312).

When the authentication unit 261 requests setting of the communication channel using the IP address or the like as a parameter, the connection control unit 263 allows the authentication unit 261 to communicate with the host of the received IP address through the wireless LAN (step S314).

The authentication unit 261 transmits the page acquisition request including the URL of the log-in page to the gateway 5 through the first communication unit 21 (step S1712).

Upon receipt of the authentication response from the gateway 5 through the first communication unit 21, the authentication unit 261 extracts the authentication result from the received authentication response, and notifies the connection control unit 263 to the effect that the web authentication has been finished, using the extracted authentication result or the like as parameter (step S316).

Upon receipt of the notice from the authentication unit 261 to the effect that the web authentication has been finished, with the authentication result or the like as parameter, the connection control unit 263 allows the authentication unit 261 to communicate with the non-illustrated DNS server through a default communication channel.

The connection control unit 263 determines whether the web authentication has succeeded, on the basis of the received authentication result (step S318).

When the web authentication is successful (Yes at step S318), the connection control unit 263 switches the communication network from the mobile phone network 10 to the wireless LAN (step S320).

When the web authentication fails (No at step S318—No), the connection control unit 263 requests the wireless LAN connection control unit 264 to cut off the connection to the access point 3 (step S322).

Upon receipt of the request to cut off the connection to the access point 3 from the connection control unit 263, the wireless LAN connection control unit 264 cuts off the connection to the access point 3, which is in process or already completed (step S324).

As described thus far, the interruption period incidental to the switching of the communication network can be eliminated by switching the communication network in accordance with the notice from the application.

The present invention is not limited to this embodiment. For example, although the communication network is switched from the mobile phone network 10 to the wireless LAN in this embodiment, the communication network may be switched reversely. Further, the connection method of this embodiment may be applied to a combination of different types (wired or wireless) of communication networks.

In this embodiment, the network to be authenticated is set when the activation of the switching delay mode is detected; however a different trigger may be adopted. For example, the setting of the network to be authenticated may be triggered by the activation of the portable terminal 2, or updating of the setup file. In addition, the network to be authenticated that has been set may be deleted when turning off of the switching delay mode is detected, or when the portable terminal 2 is turned off. Such arrangements assure the setting of the network to be authenticated, and enable effective utilization of resources such as a memory.

Although the application related to the switching delay of the communication network is exemplified by the web authentication in this embodiment, a different application may be associated with the switching delay. In this case, the communication can be performed under various communication environments or the like.

Although the web authentication is performed through the wireless LAN in this embodiment, the web authentication may be performed through the mobile phone network 10. In this case, the authentication unit 261 may skip expressly requesting the connection control unit 263 to set up the communication channel. Such an arrangement allows the communication to be performed under various communication environments or the like.

Further, the connection control unit 263 may measure the time between the notice to the effect that the connection to the access point 3 has been established and the notice to the effect that the web authentication has been completed, and cut off the connection to the access point 3 when a predetermined timeout period elapses. Such an arrangement allows the resources such as the CPU, the memory, the network, or the like to be effectively utilized.

Further, the authentication unit 261 may measure the time between the transmission of the page acquisition request and the receipt of the authentication response, and cut off the connection to the access point 3 when a predetermined timeout period elapses, and also register the access point 3 in the exclusion list (black list) so as to exclude the access point 3 from the connection target. Such an arrangement prevents reconnection to an invalid access point 3.

Further, the portable terminal 2 may cancel display of a pictogram and an accompanying message indicating that the web authentication is in process, taking into account that, while the portable terminal 2 is operating in the switching delay mode, other applications can also perform communication through the mobile phone network 10 even when the authentication unit 261 is performing the web authentication. Likewise, the portable terminal 2 may display a pictogram indicating that connection to the wireless LAN has been established, after the web authentication is completed. The mentioned arrangement minimizes complexity of the display.

Still further, the computer programs for allowing a computer to realize the functions of the processing unit 26 may be provided in the form of a computer-readable recording medium, such as a magnetic recording medium or an optical recording medium.

(Second Embodiment)

In general, a timeout program is incorporated in data processing, communication, and so forth. The timeout program refers to an arrangement to forcibly finish the data processing or communication when the time being spent for the data processing or communication exceeds a predetermined time (hereinafter, "timeout period"), for example because of no response from a server, to thereby release the resources such as a central processing unit (CPU) and a network that have been occupied. Generally, the time required for the data processing, communication, or the like is measured from the time that a request for the data processing, communication, or the like is made up to the time that the response is received. The timeout program is incorporated, for example, in the protocol of the transport layer, the application layer, or the like in the protocol stack of the transmission control protocol/internet protocol (TCP/IP) (see, for example, Japanese Laid-open Patent Publication No. 2010-187070 and Japanese Laid-open Patent Publication No. 2008-098804).

However, the time required for the data processing, communication, or the like varies depending on the processing capacity of the server, communication capacity of the network, or the like, and hence the timeout period is generally set with a certain allowance. Accordingly, the user may be forced to wait a long time before receiving a response to the request for the data processing, communication, or the like, or before the timeout is applied to the data processing, communication, or the like, depending on the processing capacity of the server, communication capacity of the network, or the like.

In particular, the inconvenience is serious when the communication is performed a plurality of times to complete a process, such as a connection process and a transaction process. Assuming that, for example, communication is performed n times to complete a process and the timeout period of each session of the communication is t minutes, the user may be forced to wait n×t minutes in a worst-case situation. Therefore, with the conventional timeout program the convenience to the user may be significantly impaired.

Accordingly, this embodiment attempts to lower an upper limit of the time required for a process in which communication is performed a plurality of times. More specifically, in this embodiment the portable terminal is connected to the Internet through the wireless LAN. In this process, the portable terminal communicates a plurality of times with each of the access point and the gateway, before the connection is established or completed. The timeout period is specified with respect to the time required for the plurality of times of communication, and when the timeout period elapses the portable terminal cuts off the connection to the access point, which is in process or already completed.

Figure 4:
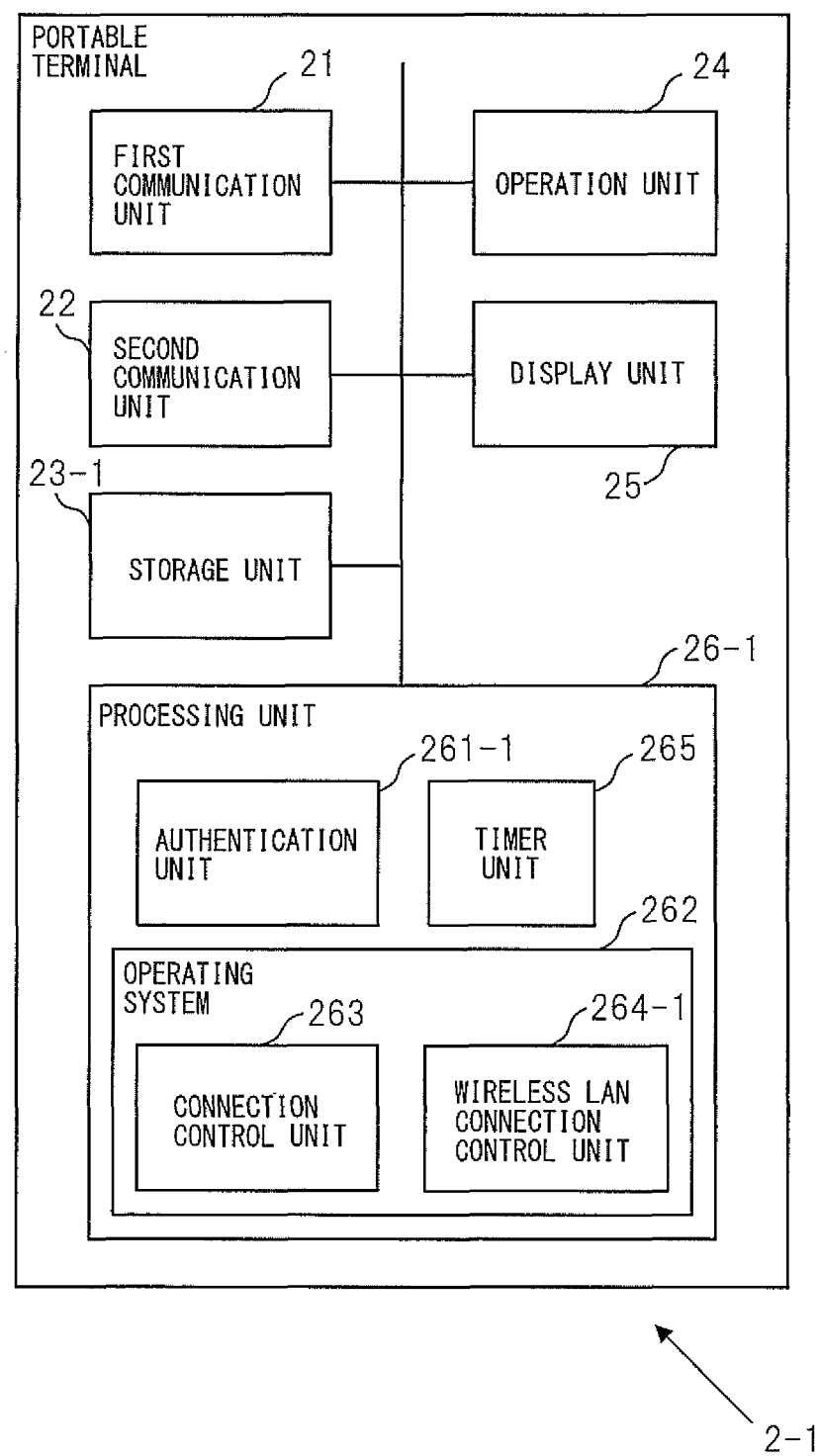
FIG. 4 is a view illustrating an example of the schematic configuration of a portable terminal according to a second embodiment.

FIG. 4 is a view illustrating an example of the schematic configuration of a portable terminal 2-1. In this configuration, the first communication unit 21, the second communication unit 22, the operation unit 24, the display unit 25, the operating system 262, and the connection control unit 263 are the same as those depicted in FIG. 2, and therefore the description thereof will not be repeated.

The storage unit 23-1 stores therein a clocking program or the like as one of the application programs, in addition to the programs stored in the storage unit 23 depicted in FIG. 2. The storage unit 23-1 also stores, as the data, the user ID and the password, the timeout period specified for the time required for the communication with the access point 3, and the timeout period or the like specified for the time required for the communication with the gateway 5.

The authentication unit 261-1 performs the web authentication with the gateway 5. The authentication unit 261-1 also requests the wireless LAN connection control unit 264-1 to cut off the connection to the access point 3. Further, the authentication unit 261-1 instructs a timer unit 265 to start or finish clocking. Details of such operations will be subsequently described.

The wireless LAN connection control unit 264-1 executes the wireless communication in compliance with IEEE 802.11 Standard. The wireless LAN connection control unit 264-1 also notifies the connection status with respect to the access point 3, to the authentication unit 261-1. Further, the wireless LAN connection control unit 264-1 cuts off the connection to the access point 3. Details of such operations will be subsequently described.

The timer unit 265 measures the time. To be more detailed, the timer unit 265 resets the clock and starts to measure the time upon receipt of an instruction to start clocking, and finishes clocking upon receipt of an instruction to finish clocking, using a predetermined time as argument. When the predetermined time specified as argument elapses before receipt of the instruction to finish clocking, the timer unit 265 notifies the authentication unit 261-1 to that effect. Further, upon receipt of an instruction to make decision regarding the lapse of time, the timer unit 265 determines whether the predetermined time specified as argument has elapsed, and returns the decision.

Hereinafter, the operation of the wireless LAN connection control unit 264-1 will be described.

Upon detecting that connection to the wireless LAN has been turned ON, the wireless LAN connection control unit 264-1 acquires an ESSID from the target list stored in the storage unit 23-1, and broadcasts the probe request including the ESSID through the first communication unit 21.

When the probe response is not received from the access point 3 through the first communication unit 21, the wireless LAN connection control unit 264-1 acquires another ESSID from the target list stored in the storage unit 23-1, and broadcasts the probe request including the ESSID through the first communication unit 21. On the other hand, when the probe response is received from the access point 3 through the first communication unit 21, the wireless LAN connection control unit 264-1 determines whether the BSSID included in the probe response is registered in the exclusion list stored in the storage unit 23-1. When the BSSID is registered in the exclusion list, the wireless LAN connection control unit 264-1 acquires still another ESSID from the target list stored in the storage unit 23-1, and broadcasts the probe request including the ESSID through the first communication unit 21. When the access point 3 is not identified through the mentioned procedure, the wireless LAN connection control unit 264-1 repeats the same procedure after initializing the exclusion list. On the other hand, when the BSSID is not registered in the exclusion list, the BSSID and the corresponding ESSID are stored in the storage unit 23-1. The wireless LAN connection control unit 264-1 transmits the authentication request to the access point 3 through the first communication unit 21. The wireless LAN connection control unit 264-1 also notifies the authentication unit 261-1 to the effect that connection to the access point 3 has been started.

Upon receipt of the authentication response from the access point 3 through the first communication unit 21, the wireless LAN connection control unit 264-1 confirms the authentication of the access point 3 and then transmits the association request to the access point 3 through the first communication unit 21. The wireless LAN connection control unit 264-1 then notifies, upon receipt of the association response from the access point 3 through the first communication unit 21, the authentication unit 261-1 to the effect that connection to the access point 3 has been established.

When the request for disconnection from access point 3 is received from the authentication unit 261-1, the wireless LAN connection control unit 264-1 cuts off the connection to the access point 3, which is in process or already completed.

Hereinafter, the operation of the authentication unit 261-1 will be described.

Upon receipt of the notice from the wireless LAN connection control unit 264-1 to the effect that the connection to the access point 3 has been started, the authentication unit 261-1 acquires from the storage unit 23-1 the timeout period specified for the time required for communication with the access point 3, and instructs the timer unit 265 to start clocking using the timeout period as argument.

Upon receipt of the notice from the timer unit 265 to the effect that the timeout period given as argument has elapsed, the authentication unit 261-1 requests the wireless LAN connection control unit 264-1 to cut off the connection to the access point 3.

Upon receipt of the notice from the wireless LAN connection control unit 264-1 to the effect that the connection to the access point 3 has been established, the authentication unit 261-1 instructs the timer unit 265 to finish clocking. The authentication unit 261-1 also transmits the page acquisition request to the gateway 5 through the first communication unit 21. Further, the authentication unit 261-1 acquires from the storage unit 23-1 the timeout period specified for the time required for communication with the gateway 5, and instructs the timer unit 265 to start clocking using the timeout period as argument.

Upon receipt of the notice from the timer unit 265 to the effect that the timeout period given as argument has elapsed, the authentication unit 261-1 requests the wireless LAN connection control unit 264-1 to cut off the connection to the access point 3.

Upon receipt of the log-in page from the gateway 5 through the first communication unit 21, the authentication unit 261-1 acquires the user ID and the password from the storage unit 23-1, and transmits the authentication request including the ID and the password to the gateway 5 through the first communication unit 21. Further, upon receipt of the authentication response from the gateway 5 through the first communication unit 21, the authentication unit 261-1 instructs the timer unit 265 to stop clocking, irrespective of whether the user has been authenticated by the gateway 5.

Figure 5:
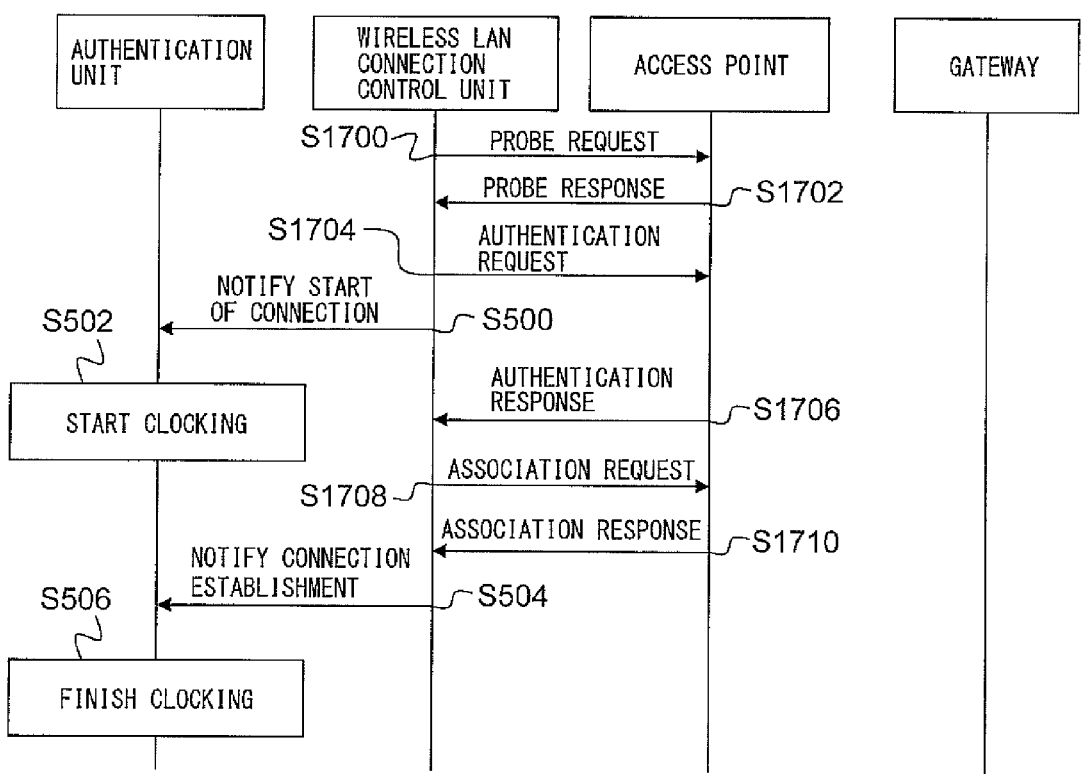
FIG. 5 is a view indicating an example of the operation sequence of the wireless communication system representing a success in connection to an access point.

FIG. 5 is a view indicating an example of the operation sequence of the wireless communication system 1 representing a success in connection to the access point 3.

Upon detecting that connection to the wireless LAN has been turned ON, the wireless LAN connection control unit 264-1 acquires an ESSID from the target list stored in the storage unit 23-1, and broadcasts the probe request including the ESSID through the first communication unit 21 (step S1700).

The access point 3 returns the probe response when the ESSID in the received probe request is the same as its own ESSID or "ANY" (step S1702).

When the probe response is not received from the access point 3 through the first communication unit 21, the wireless LAN connection control unit 264-1 acquires another ESSID from the target list stored in the storage unit 23-1, and broadcasts the probe request including the ESSID through the first communication unit 21 (step S1700).

On the other hand, when the probe response is received from the access point 3 through the first communication unit 21, the wireless LAN connection control unit 264-1 determines whether the BSSID included in the probe response is registered in the exclusion list stored in the storage unit 23-1. When the BSSID is registered in the exclusion list, the wireless LAN connection control unit 264-1 acquires still another ESSID from the target list stored in the storage unit 23-1, and broadcasts the probe request including the ESSID through the first communication unit 21 (step S1700).

When the access point 3 is unable to be identified through the steps S1700 to 1702, the wireless LAN connection control unit 264-1 repeats the steps S1700 to 1702 after initializing the exclusion list.

On the other hand, when the BSSID is not registered in the exclusion list, the wireless LAN connection control unit 264-1 stores the BSSID and the corresponding ESSID in the storage unit 23-1. The wireless LAN connection control unit 264-1 also transmits the authentication request to the access point 3 through the first communication unit 21 (step S1704).

The wireless LAN connection control unit 264-1 notifies the authentication unit 261-1 to the effect that connection to the access point 3 has been started (step S500).

Upon receipt of the notice from the wireless LAN connection control unit 264-1 to the effect that the connection to the access point 3 has been started, the authentication unit 261-1 acquires from the storage unit 23-1 the timeout period specified for the time required for communication with the access point 3, and instructs the timer unit 265 to start clocking using the timeout period as argument (step S502).

Upon receipt of the authentication request from the portable terminal 2-1, the access point 3 determines whether the portable terminal 2-1 may be authenticated using a predetermined algorithm, and returns an authentication response including the decision (step S1706).

Upon receipt of the authentication response from the access point 3 through the first communication unit 21, the wireless LAN connection control unit 264-1 confirms the authentication of the access point 3, and then transmits the association request to the access point 3 through the first communication unit 21 (step S1708).

The access point 3 returns the association response, upon confirming that the MAC address is the authenticated one and that all the parameters in the received association request correspond to the access point 3 (step S1710).

Upon receipt of the association response from the access point 3 through the first communication unit 21, the wireless LAN connection control unit 264-1 notifies the authentication unit 261-1 to the effect that connection to the access point 3 has been established (step S504).

Upon receipt of the notice from the wireless LAN connection control unit 264-1 to the effect that the connection to the access point 3 has been established, the authentication unit 261-1 instructs the timer unit 265 to finish clocking (step S506).

Figure 6:
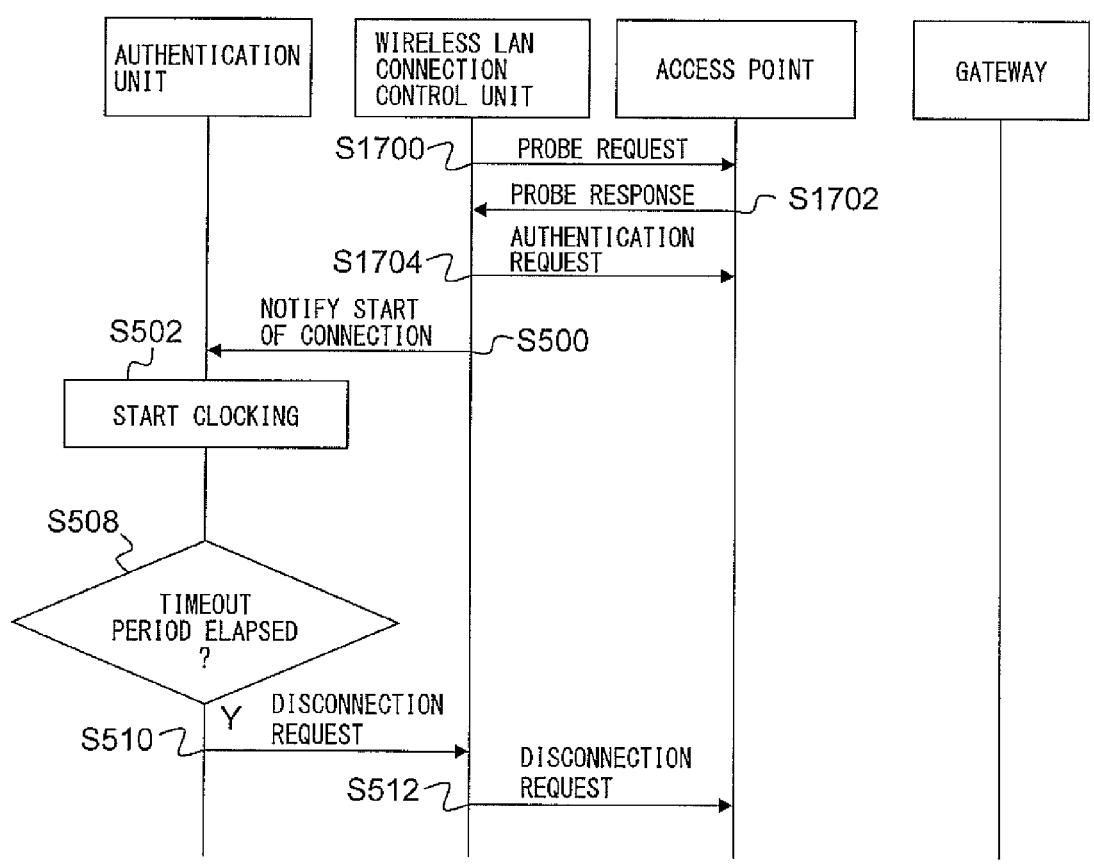
FIG. 6 is a view indicating an example of the operation sequence of the wireless communication system representing a failure in connection to the access point.

FIG. 6 is a view indicating an example of the operation sequence of the wireless communication system 1 representing a failure in making connection to the access point 3. Out of the following operation sequence, steps S1700 to 1704 and steps 500, 502 are the same as those included in FIG. 5, and therefore the description of those steps will not be repeated.

Upon receipt of the notice from the timer unit 265 to the effect that the timeout period given as argument has elapsed (Yes at step S508), the authentication unit 261-1 requests the wireless LAN connection control unit 264-1 to cut off the connection to the access point 3 (step S510).

When the request for disconnection from access point 3 is received from the authentication unit 261-1, the wireless LAN connection control unit 264-1 cuts off the connection to the access point 3 which is in process (step S512).

Figure 7:
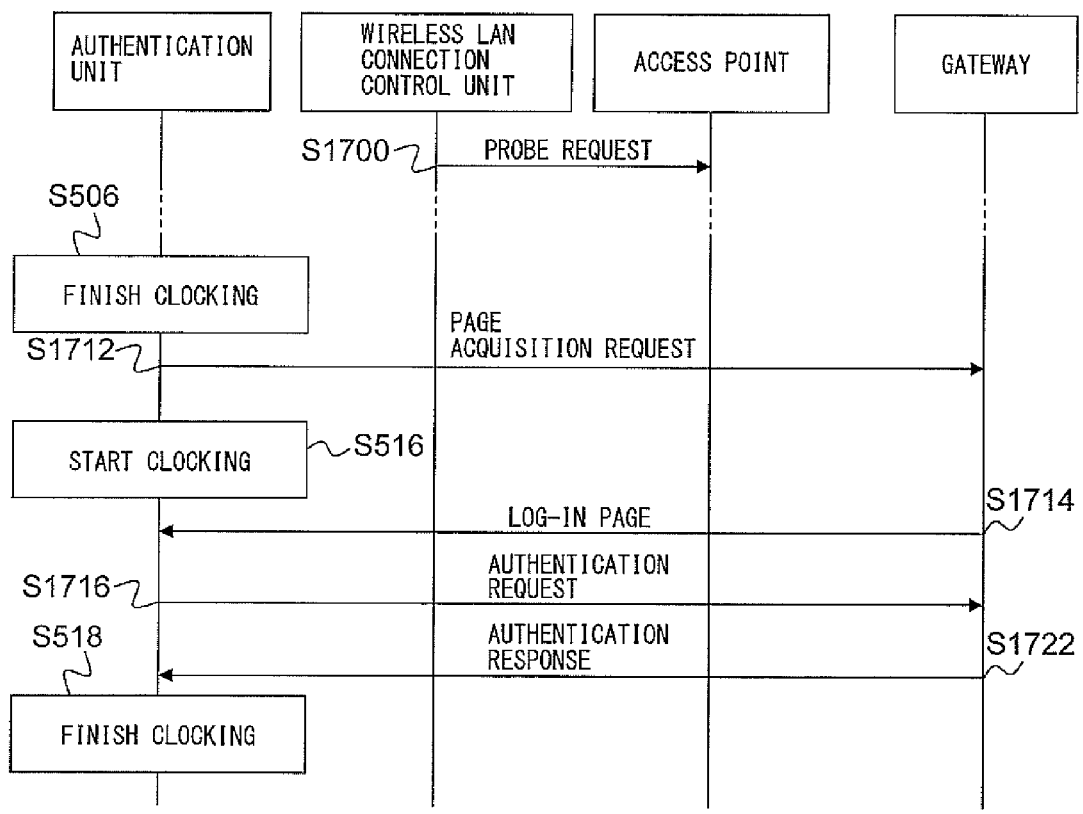
FIG. 7 is a view indicating an example of the operation sequence of the wireless communication system representing a success in acquiring authentication through a gateway.

FIG. 7 is a view indicating an example of the operation sequence of the wireless communication system 1 representing a success in acquiring the authentication through the gateway 5. Out of the following operation sequence, steps S1700 to 1710, and steps S500 to 506 are the same as those included in FIG. 5, and therefore the description of those steps will not be repeated.

The authentication unit 261-1 transmits the page acquisition request to the gateway 5 through the first communication unit 21 (step S1712).

The authentication unit 261-1 acquires from the storage unit 23-1 the timeout period specified for the time required for communication with the gateway 5, and instructs the timer unit 265 to start clocking using the timeout period as argument (step S516).

The gateway 5 returns the page corresponding to the URL in the received page acquisition request, i.e., the log-in page (step S1714).

Upon receipt of the log-in page from the gateway 5 through the first communication unit 21, the authentication unit 261-1 acquires the user ID and the password from the storage unit 23-1, and transmits the authentication request including the ID and the password to the gateway 5 through the first communication unit 21 (step S1716).

The gateway 5 transfers the received authentication request to the authentication server 6. The gateway 5 also transfers the received authentication response to the portable terminal 2-1 (step S1722).

Upon receipt of the authentication response from the gateway 5 through the first communication unit 21, the authentication unit 261-1 instructs the timer unit 265 to stop clocking, irrespective of whether the user has been authenticated by the gateway 5 (step S518).

Figure 8:
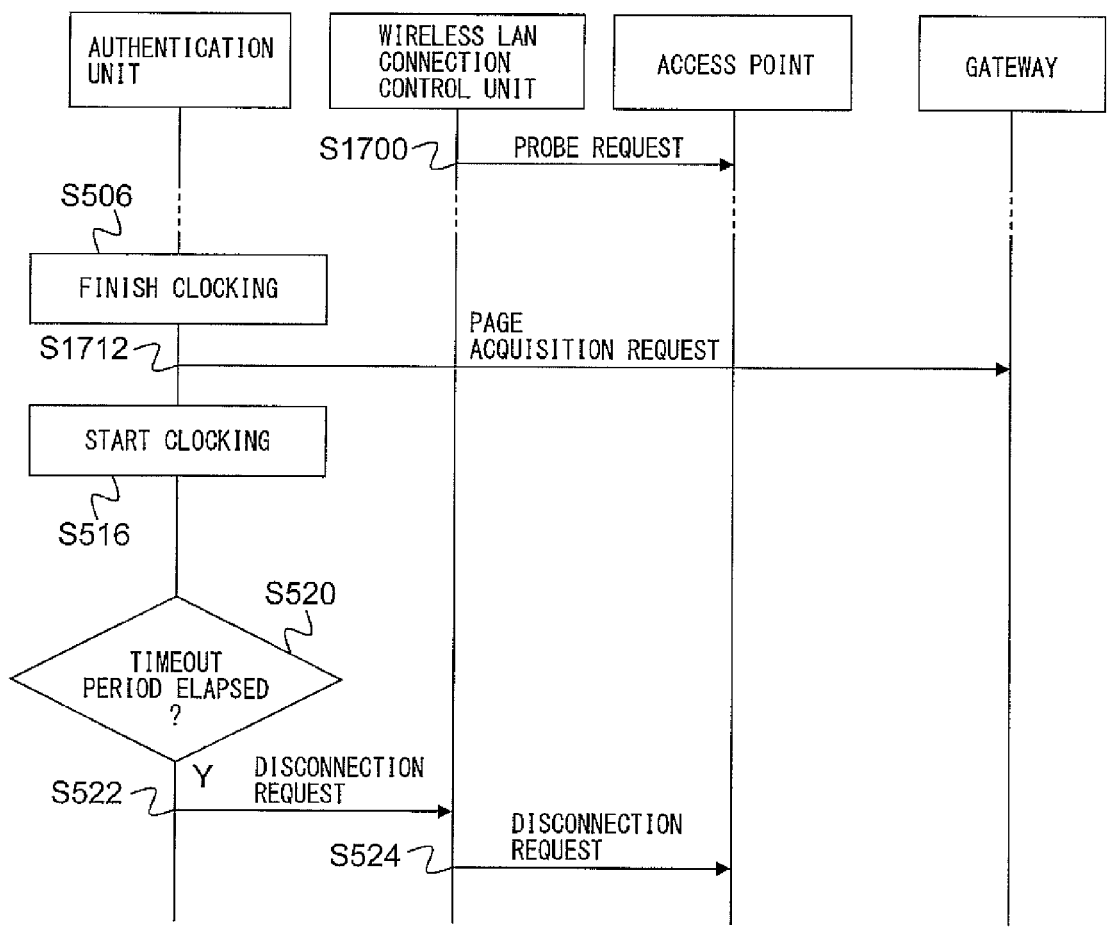
FIG. 8 is a view indicating an example of the operation sequence of the wireless communication system representing a failure in acquiring authentication through the gateway.

FIG. 8 is a view indicating an example of the operation sequence of the wireless communication system 1 representing a failure in acquiring the authentication through the gateway 5. Out of the following operation sequence, steps S1700 to 1712, steps S500 to 506, and step S516 are the same as those included in FIG. 5 and FIG. 7, and therefore the description of the steps will not be repeated.

Upon receipt of the notice from the timer unit 265 to the effect that the timeout period given as argument has elapsed (Yes at step S520), the authentication unit 261-1 requests the wireless LAN connection control unit 264-1 to cut off the connection to the access point 3 (step S522).

When the request for disconnection from access point 3 is received from the authentication unit 261-1, the wireless LAN connection control unit 264-1 cuts off the connection to the access point 3, which is already completed (step S524).

As described thus far, the upper limit of the time required for a process can be lowered, by cumulatively measuring the time required for a plurality of times of communication, and forcibly disconnecting the communication, when the predetermined timeout period elapses, before the plurality of times of communication is finished.

The present invention is not limited to this embodiment. For example, although only one gateway is provided in this embodiment, a plurality of gateways may be provided. Applying the present embodiment to each of the gateways allows the upper limit of the time required for communication with each gateway to be lowered, thereby enabling, consequently, the upper limit of the time required for communication with all the gateways, to which the present embodiment is applied, to be lowered.

(Third Embodiment)

In the second embodiment, the same timeout period is specified for the time required for communication with the gateway 5, irrespective of the network (ESSID). However, normally the time required for communication with the gateway 5 is different depending on the network. Accordingly, different timeout periods are specified for different networks, in this embodiment.

Figure 9:
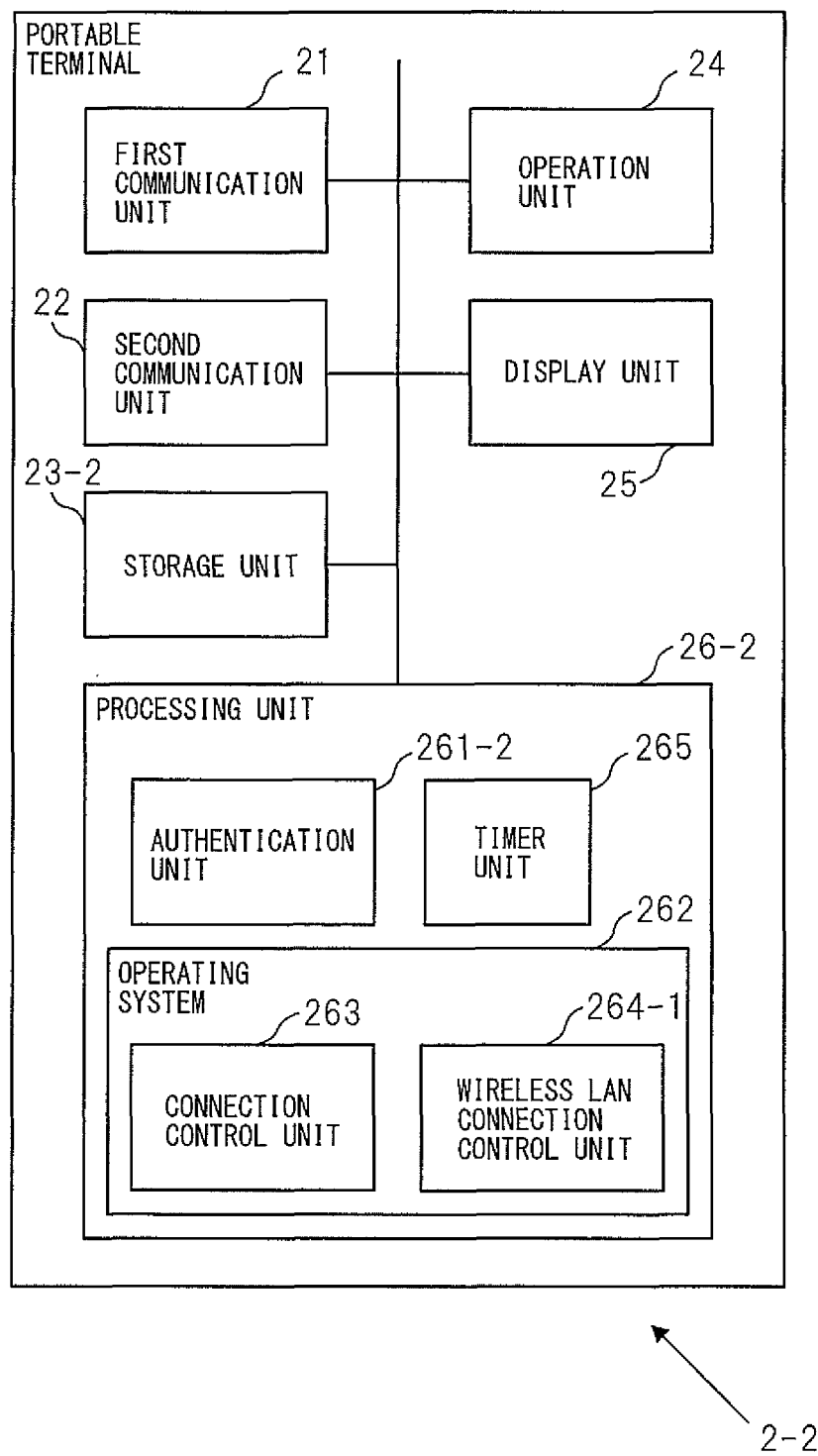
FIG. 9 is a view illustrating an example of the schematic configuration of a portable terminal according to a third embodiment.

FIG. 9 is a view illustrating an example of the schematic configuration of a portable terminal 2-2. In this configuration, the first communication unit 21, the second communication unit 22, the operation unit 24, the display unit 25, the operating system 262, the connection control unit 263, the wireless LAN connection control unit 264-1, and the timer unit 265 are the same as those depicted in FIG. 4, and therefore the description thereof will not be repeated.

The storage unit 23-2 stores therein, as the data, a table including the BSSID of the networks to be connected and the corresponding timeout periods, in addition to the data stored in the storage unit 23-1 depicted in FIG. 4.

The authentication unit 261-2 performs the web authentication with the gateway 5. The authentication unit 261-2 also requests the wireless LAN connection control unit 264-1 to cut off the connection to the access point 3. The authentication unit 261-2 also instructs a timer unit 265 to start or finish clocking. Further, the authentication unit 261-2 specifies a different timeout period for each network. To be more detailed, the authentication unit 261-2 acquires from the storage unit 23-2 the ESSID of the network to which a connection is already completed, after transmitting the page acquisition request to the gateway 5 through the first communication unit 21, and looks up the table stored in the storage unit 23-2 using the ESSID as key, to thereby extract the corresponding timeout period. In addition, the authentication unit 261-2 instructs the timer unit 265 to start clocking using the timeout period as argument.

Figure 10:
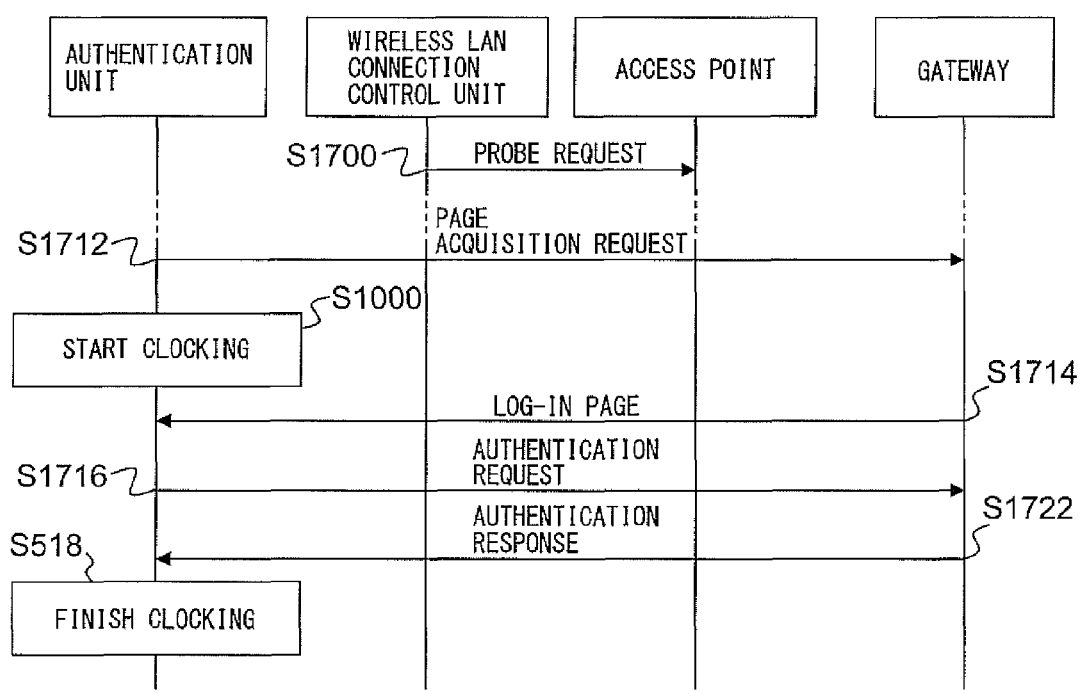
FIG. 10 is a view indicating an example of the operation sequence of the wireless communication system representing a success in acquiring authentication through the gateway.

FIG. 10 is a view indicating an example of the operation sequence of the wireless communication system 1 representing a success in acquiring the authentication through the gateway 5. Out of the following operation sequence, steps S1700 to 1722, steps S500 to 506, and step S518 are the same as those included in FIG. 5 and FIG. 7, and therefore the description of those steps will not be repeated.

The authentication unit 261-2 acquires from the storage unit 23-2 the ESSID of the network to which a connection is already completed, and looks up the table stored in the storage unit 23-2 using the ESSID as key, to thereby extract the corresponding timeout period. In addition, the authentication unit 261-2 instructs the timer unit 265 to start clocking using the timeout period as argument (step S1000).

As described above, specifying predetermined timeout periods for different networks allows the upper limit of the time required for a process to be more effectively lowered.

The present invention is not limited to this embodiment. For example, although the timeout period is specified for each network (ESSID) in this embodiment, the timeout period may be specified for each access point (BSSID). Such an arrangement allows the upper limit of the time required for a process to be even more effectively lowered.

Further, the timeout period may be changed by the user or the system, by modifying the setup file or the like. Such an arrangement allows the communication to be performed under various communication environments or the like.

(Fourth Embodiment)

In the exclusion list, the access points desired to be excluded from the connection targets are registered. When an application or the like registers the access point desired to be excluded from the connection targets for some reason (for example, the connection takes time, the communication rate is too low, and so forth), such an access point is automatically excluded from the connection targets through the procedure specified in FIG. 17.

Figure 17:
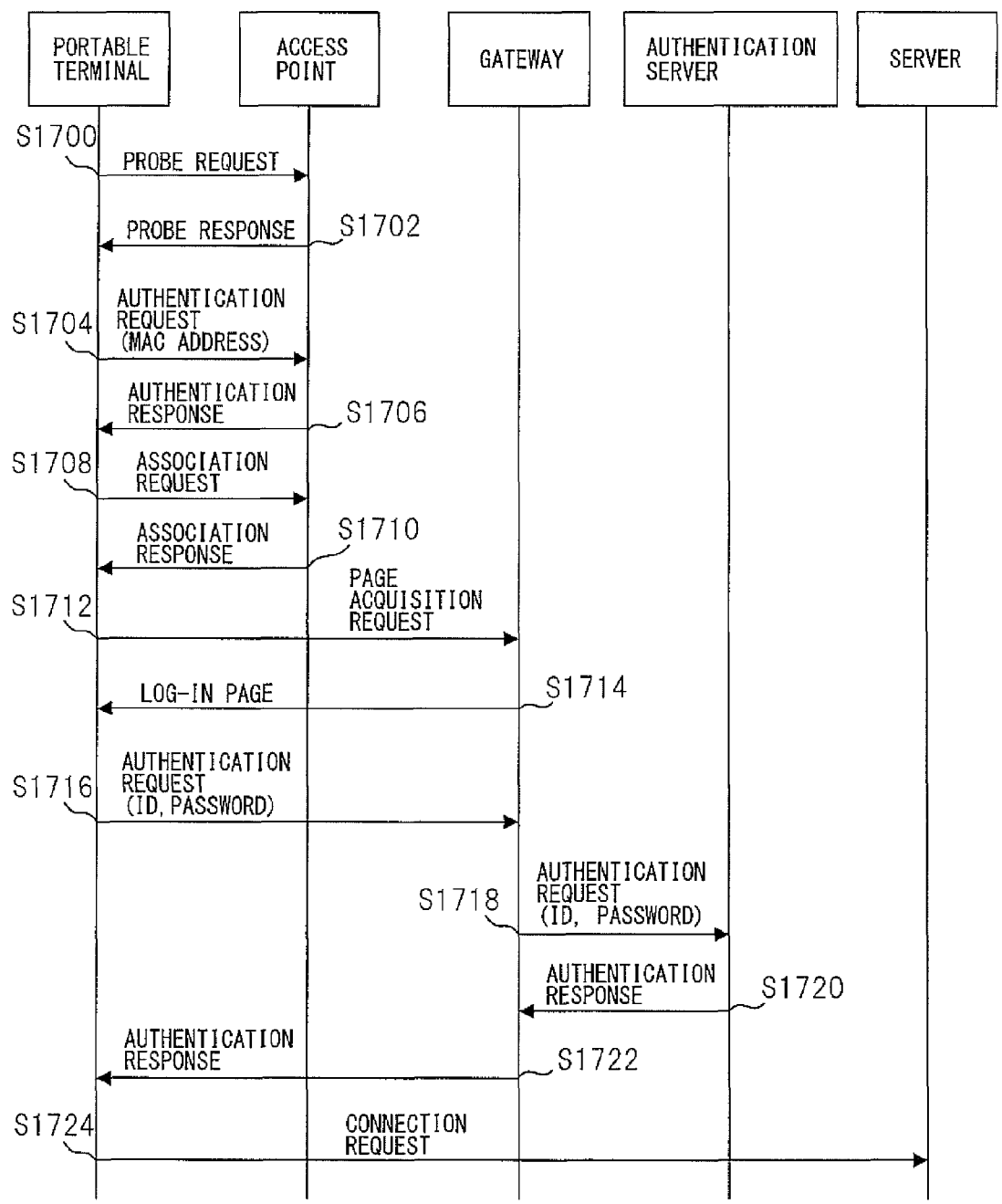
FIG. 17 is a view indicating an example of the operation sequence of a conventional wireless LAN communication system.

With the procedure specified in FIG. 17, however, the exclusion list is forcibly initialized when the access point is unable to be identified. Accordingly, the access point desired to be deleted from the connection targets may be identified, and therefore convenience to the user may be significantly impaired.

Accordingly, this embodiment attempts to assure that a predetermined access point is excluded from the connection targets. To be more detailed, in this embodiment the portable terminal possesses a reproduction of the exclusion list (hereinafter, "duplicate exclusion list"). In addition, when start of connection to an access point registered in the duplicate exclusion list (hereinafter, "excluded access point") is detected, the portable terminal cuts off the connection to the excluded access point and temporarily deletes the corresponding network from the target list. The temporarily deleted network is re-registered in the target list at a predetermined time point.

Figure 11:
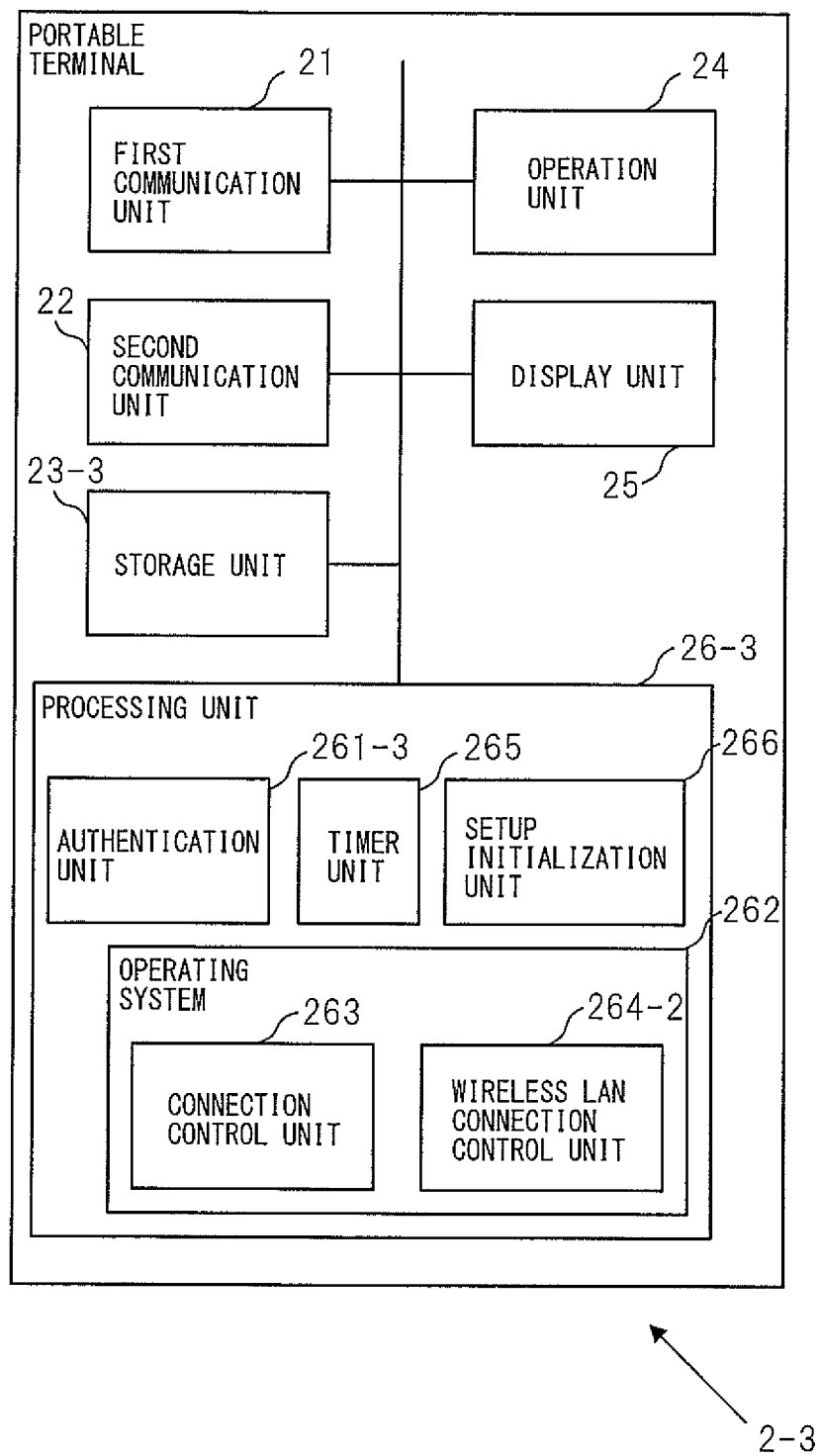
FIG. 11 is a view illustrating an example of the schematic configuration of a portable terminal according to a fourth embodiment.

FIG. 11 is a view illustrating an example of the schematic configuration of a portable terminal 2-3. In this configuration, the first communication unit 21, the second communication unit 22, the operation unit 24, the display unit 25, the operating system 262, the connection control unit 263, and the timer unit 265 are the same as those depicted in FIG. 9, and therefore the description thereof will not be repeated.

The storage unit 23-3 stores therein, as one of the application programs, a setup initialization program or the like for initializing the settings related to the connection control, in addition to the programs stored in the storage unit 23-2 depicted in FIG. 9. The storage unit 23-3 also stores, as the data, an isolation list including the ESSID temporarily deleted from the target list, and the duplicate exclusion list which is the reproduction of the exclusion list.

The authentication unit 261-3 performs the web authentication with the gateway 5. The authentication unit 261-3 registers the BSSID of the access point 3 in the exclusion list and the duplicate exclusion list. The authentication unit 261-3 also deletes the ESSID of the network from the target list and registers the ESSID in the isolation list. Further, the authentication unit 261-3 requests the wireless LAN connection control unit 264-2 to cut off the connection to the access point 3. Details of such operations will be subsequently described.

The wireless LAN connection control unit 264-2 executes the wireless communication in compliance with IEEE 802.11 Standard. The wireless LAN connection control unit 264-2 registers the BSSID of the access point 3 in the exclusion list, and initializes the exclusion list. The wireless LAN connection control unit 264-2 also registers the ESSID of the network in the target list, and deletes the ESSID from the target list. The wireless LAN connection control unit 264-2 also notifies the connection status with respect to the access point 3. Further, the wireless LAN connection control unit 264-2 cuts off the connection to the access point 3. Still further, the wireless LAN connection control unit 264-2 performs scanning and notifies the result. Details of such operations will be subsequently described.

The setup initialization unit 266 initializes the settings related to the connection control. More specifically, the setup initialization unit 266 performs scanning at a predetermined time point, and initializes the exclusion list, the duplicate exclusion list, the target list, and the isolation list when the excluded access point 3 is not detected. Details of such operations will be subsequently described.

Hereinafter, the operation of the authentication unit 261-3 will be described.

When a predetermined access point 3 is detected, the authentication unit 261-3 requests the wireless LAN connection control unit 264-2 to register the BSSID of the access point 3 in the exclusion list. The authentication unit 261-3 also registers the BSSID in the duplicate exclusion list stored in the storage unit 23-3. Further, the authentication unit 261-3 requests the wireless LAN connection control unit 264-2 to cut off the connection to the access point 3. It will be assumed that the predetermined access point 3 is the one to which a connection requires a time exceeding a predetermined timeout period.

Upon receipt of a notice from the wireless LAN connection control unit 264-2 to the effect that connection to the access point 3 has been started, the authentication unit 261-3 looks up the duplicate exclusion list stored in the storage unit 23-3, and determines whether the BSSID is registered. When the BSSID is registered, the authentication unit 261-3 requests the wireless LAN connection control unit 264-2 to delete the corresponding ESSID from the target list. The authentication unit 261-3 also registers the ESSID in the isolation list stored in the storage unit 23-3. Further, the authentication unit 261-3 requests the wireless LAN connection control unit 264-2 to cut off the connection to the access point 3.

Hereinafter, the operation of the wireless LAN connection control unit 264-2 will be described.

At a predetermined time point, the wireless LAN connection control unit 264-2 acquires an ESSID from the target list stored in the storage unit 23-3, and broadcasts the probe request including the ESSID through the first communication unit 21. Here, it will be assumed that the predetermined time point is the time that the connection to the access point 3 is cut off while the connection to the wireless LAN is ON. When the probe response is not received from the access point 3 through the first communication unit 21, the wireless LAN connection control unit 264-2 acquires another ESSID from the target list stored in the storage unit 23-3, and broadcasts the probe request including the ESSID through the first communication unit 21. On the other hand, when the probe response is received from the access point 3 through the first communication unit 21, the wireless LAN connection control unit 264-2 determines whether the BSSID included in the probe response is registered in the exclusion list stored in the storage unit 23-3. When the BSSID is registered in the exclusion list, the wireless LAN connection control unit 264-2 acquires still another ESSID from the target list stored in the storage unit 23-3, and broadcasts the probe request including the ESSID through the first communication unit 21. When the access point 3 is not identified through the mentioned procedure, the wireless LAN connection control unit 264-2 repeats the same procedure after initializing the exclusion list. On the other hand, when the BSSID is not registered in the exclusion list, the wireless LAN connection control unit 264-2 stores the BSSID and the corresponding ESSID in the storage unit 23-3. The wireless LAN connection control unit 264-2 transmits the authentication request to the access point 3 through the first communication unit 21. The wireless LAN connection control unit 264-2 also notifies the authentication unit 261-3 that connection to the access point 3 has been started.

When the request for disconnection from the access point 3 is received from the authentication unit 261-3, the wireless LAN connection control unit 264-2 cuts off the connection to the access point 3 which is in process or already completed.

Upon receipt of the request to register the BSSID in the exclusion list from the authentication unit 261-3, the wireless LAN connection control unit 264-2 registers the BSSID in the exclusion list stored in the storage unit 23-3. In addition, upon receipt of the request to initialize the exclusion list from the setup initialization unit 266, the wireless LAN connection control unit 264-2 initializes the exclusion list (deletes the BSSID) stored in the storage unit 23-3.

Upon receipt of the request to register the ESSID in the target list from the setup initialization unit 266, the wireless LAN connection control unit 264-2 registers the ESSID in the target list stored in the storage unit 23-3. In addition, upon receipt of the request to delete the ESSID from the target list from the authentication unit 261-3, the wireless LAN connection control unit 264-2 deletes the ESSID from the target list stored in the storage unit 23-3.

Upon receipt of the request for scanning from the setup initialization unit 266, the wireless LAN connection control unit 264-2 broadcasts the probe request including the ESSID "ANY" through the first communication unit 21. In addition, upon receipt of the probe response from the access point 3 through the first communication unit 21, the wireless LAN connection control unit 264-2 extracts the BSSID from the probe response, and returns the BSSID to the setup initialization unit 266.

Hereinafter, the operation of the setup initialization unit 266 will be described.

The setup initialization unit 266 requests, at a predetermined time point, the wireless LAN connection control unit 264-2 to perform the scanning, when at least one BSSID is registered in the duplicate exclusion list stored in the storage unit 23-3. Here, it will be assumed that the predetermined time point is the time that the display unit 24 is turned ON while the connection to the wireless LAN is ON.

Upon receipt of the scanning result from the wireless LAN connection control unit 264-2, the setup initialization unit 266 compares the scanning result with the duplicate exclusion list stored in the storage unit 23-3, and determines whether the excluded access point 3 has been detected. When the excluded access point 3 is not detected, the setup initialization unit 266 again requests the wireless LAN connection control unit 264-2 to perform the scanning.

Upon receipt of the scanning result from the wireless LAN connection control unit 264-2, the setup initialization unit 266 compares the scanning result with the duplicate exclusion list stored in the storage unit 23-3, and determines whether the excluded access point 3 has been detected. When the excluded access point 3 is not detected this time either, the setup initialization unit 266 requests the wireless LAN connection control unit 264-2 to initialize the exclusion list. The setup initialization unit 266 also initializes the duplicate exclusion list (deletes the BSSID) stored in the storage unit 23-3. Further, the setup initialization unit 266 acquires the ESSID from the isolation list stored in the storage unit 23-3, and requests the wireless LAN connection control unit 264-2 to register the ESSID in the target list. The setup initialization unit 266 then initializes the isolation list (deletes the ESSID) stored in the storage unit 23-3.

Figure 12:
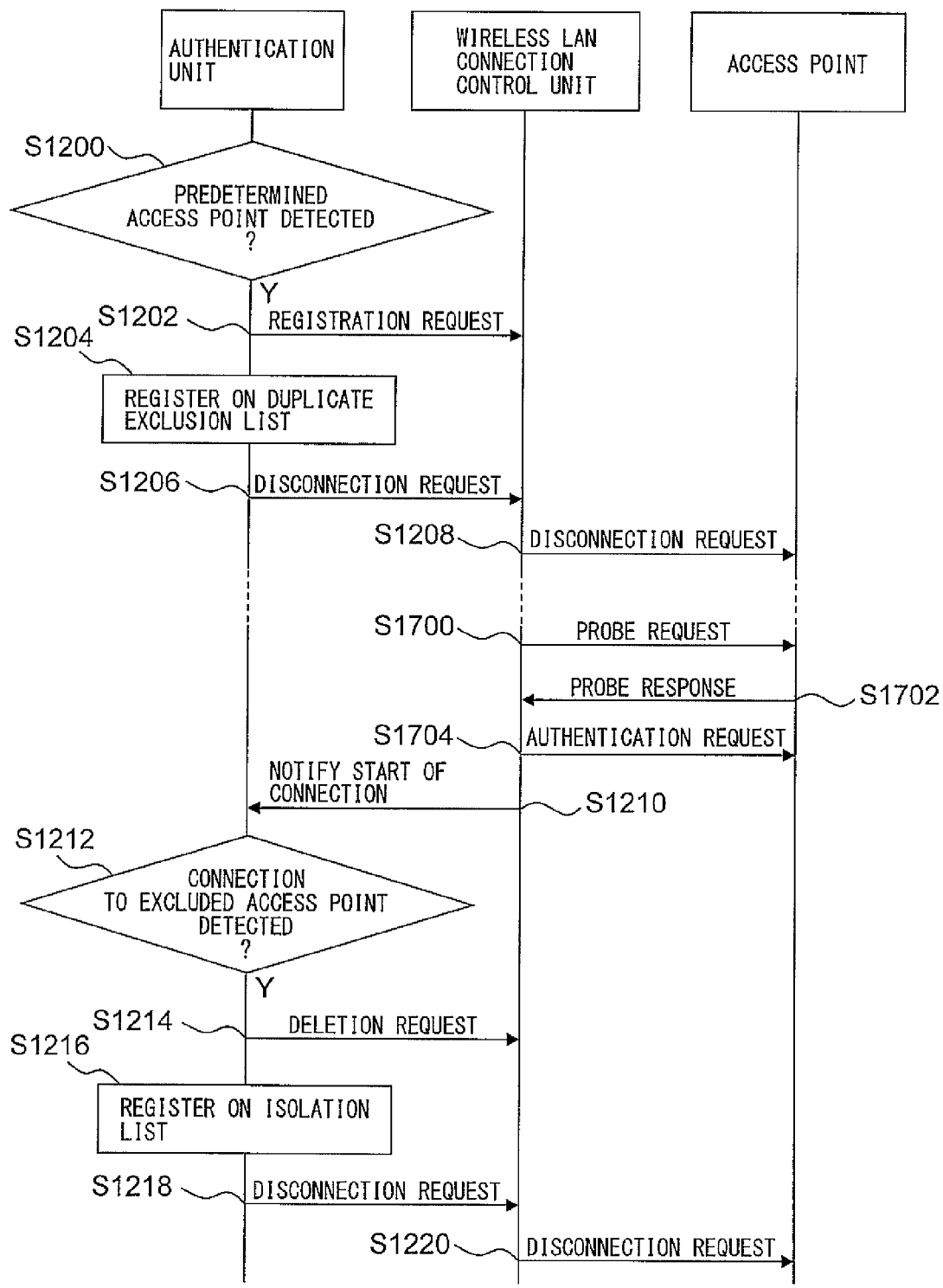
FIG. 12 is a view indicating an example of the operation sequence of the wireless communication system.

FIG. 12 is a view indicating an example of the operation sequence of the wireless communication system 1.

When the predetermined access point 3 is detected (Yes at step S1200), the authentication unit 261-3 requests the wireless LAN connection control unit 264-2 to register the ESSID of the access point 3 in the exclusion list (step S1202).

The authentication unit 261-3 registers the BSSID also in the duplicate exclusion list stored in the storage unit 23-3 (step S1204).

The authentication unit 261-3 requests the wireless LAN connection control unit 264-2 to cut off the connection to the access point 3 (step S1206).

When the request for disconnection from access point 3 is received from the authentication unit 261-3, the wireless LAN connection control unit 264-2 cuts off the connection to the access point 3, which is in process or has been established (step S1208).

At the predetermined time point, the wireless LAN connection control unit 264-2 acquires an ESSID from the target list stored in the storage unit 23-3, and broadcasts the probe request including the ESSID through the first communication unit 21 (step S1700).

The access point 3 returns the probe response when the ESSID in the received probe request is the same as its own ESSID or "ANY" (step S1702).

When the probe response is not received from the access point 3 through the first communication unit 21, the wireless LAN connection control unit 264-2 acquires another ESSID from the target list stored in the storage unit 23-3, and broadcasts the probe request including the ESSID through the first communication unit 21 (step S1700).

On the other hand, when the probe response is received from the access point 3 through the first communication unit 21, the wireless LAN connection control unit 264-2 determines whether the BSSID included in the probe response is registered in the exclusion list stored in the storage unit 23-3. When the BSSID is registered in the exclusion list, the wireless LAN connection control unit 264-2 acquires still another ESSID from the target list stored in the storage unit 23-3, and broadcasts the probe request including the ESSID through the first communication unit 21 (step S1700).

When the access point 3 is unable to be identified through the steps S1700 to 1702, the wireless LAN connection control unit 264-2 repeats the steps S1700 to 1702 after initializing the exclusion list.

On the other hand, when the BSSID is not registered in the exclusion list, the wireless LAN connection control unit 264-2 stores the BSSID and the corresponding ESSID in the storage unit 23-3. The wireless LAN connection control unit 264-2 also transmits the authentication request to the access point 3 through the first communication unit 21 (step S1704).

The wireless LAN connection control unit 264-2 notifies the authentication unit 261-3 to the effect that connection to the access point 3 has been started (step S1210)

Upon receipt of the notice from the wireless LAN connection control unit 264-2 to the effect that connection to the access point 3 has been started, the authentication unit 261-3 looks up the duplicate exclusion list stored in the storage unit 23-3, and determines whether the BSSID is registered. When the BSSID is registered (Yes at step S1212), the authentication unit 261-3 requests the wireless LAN connection control unit 264-2 to delete the corresponding ESSID from the target list (step S1214).

The authentication unit 261-3 registers the ESSID in the isolation list stored in the storage unit 23-3 (step S1216).

The authentication unit 261-3 requests the wireless LAN connection control unit 264-2 to cut off the connection to the access point 3 (step S1218).

When the request for disconnection from the access point 3 is received from the authentication unit 261-3, the wireless LAN connection control unit 264-2 cuts off the connection to the access point 3 which is in process (step S1220).

Figure 13:
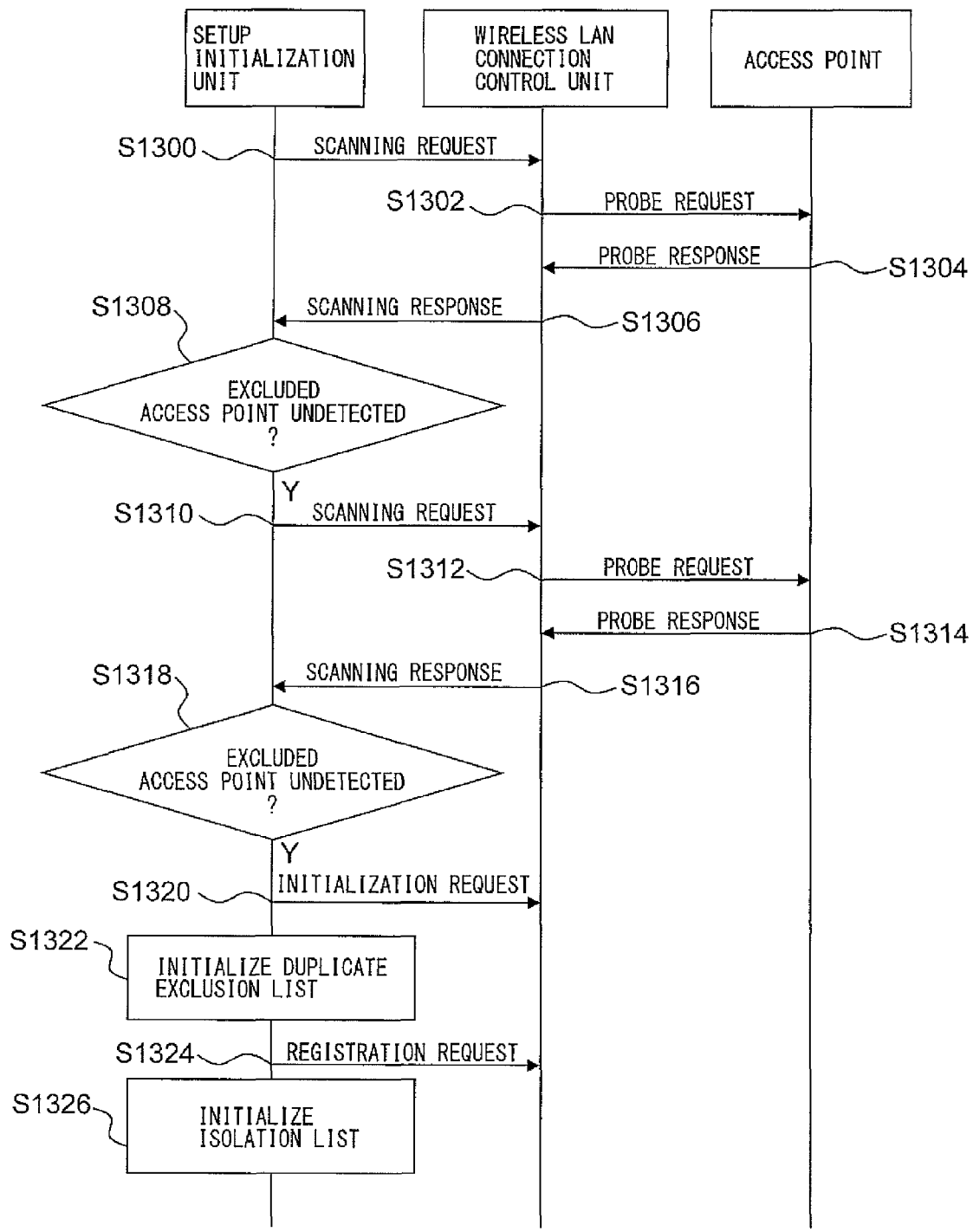
FIG. 13 is a view indicating an example of another operation sequence of the wireless communication system.

FIG. 13 is a view indicating an example of another operation sequence of the wireless communication system 1.

The setup initialization unit 266 requests, at the predetermined time point, the wireless LAN connection control unit 264-2 to perform the scanning, when at least one BSSID is registered in the duplicate exclusion list stored in the storage unit 23-3 (step S1300).

Upon receipt of the request for scanning from the setup initialization unit 266, the wireless LAN connection control unit 264-2 broadcasts the probe request including the ESSID "ANY" through the first communication unit 21 (step S1302).

The access point 3 returns the probe response when the ESSID in the received probe request is the same as its own ESSID or "ANY" (step S1304).

Upon receipt of the probe response from the access point 3 through the first communication unit 21, the wireless LAN connection control unit 264-2 extracts the BSSID from the probe response, and returns the BSSID to the setup initialization unit 266 (step S1306).

Upon receipt of the scanning result from the wireless LAN connection control unit 264-2, the setup initialization unit 266 compares the scanning result with the duplicate exclusion list stored in the storage unit 23-3, and determines whether the excluded access point 3 has been detected. When the excluded access point 3 is not detected (Yes at step S1308), the setup initialization unit 266 again requests the wireless LAN connection control unit 264-2 to perform the scanning (step S1310).

Upon receipt of the request for scanning from the setup initialization unit 266, the wireless LAN connection control unit 264-2 broadcasts the probe request including the ESSID "ANY" through the first communication unit 21 (step S1312).

The access point 3 returns the probe response when the ESSID in the received probe request is the same as its own ESSID or "ANY" (step S1314).

Upon receipt of the probe response from the access point 3 through the first communication unit 21, the wireless LAN connection control unit 264-2 extracts the BSSID from the probe response, and returns the BSSID to the setup initialization unit 266 (step S1316).

Upon receipt of the scanning result from the wireless LAN connection control unit 264-2, the setup initialization unit 266 compares the scanning result with the duplicate exclusion list stored in the storage unit 23-3, and determines whether the excluded access point 3 has been detected. When the excluded access point 3 is not detected this time either (Yes at step S1318), the setup initialization unit 266 requests the wireless LAN connection control unit 264-2 to initialize the exclusion list (step S1320).

The setup initialization unit 266 also initializes the duplicate exclusion list stored in the storage unit 23-3 (step S1322).

The setup initialization unit 266 acquires the ESSID from the isolation list stored in the storage unit 23-3, and requests the wireless LAN connection control unit 264-2 to register the ESSID in the target list (step S1324).

The setup initialization unit 266 initializes the isolation list stored in the storage unit 23-3 (step S1326).

As described thus far, the predetermined access point can be surely excluded from the connection targets by having the reproduction of the exclusion list, and cutting off the connection to the access point and temporarily deleting the corresponding network from the target list upon detecting that the connection to the access point registered in the exclusion list has been started.

The present invention is not limited to this embodiment. For example, in this embodiment the access point 3 to which a connection requires a time exceeding the predetermined timeout period is registered in the exclusion list, however a different access point 3 may be registered. For example, the access point 3 that requires a time exceeding the predetermined timeout period for the authentication through the gateway 5 may be registered. Such an arrangement allows various types of access point 3 to be excluded from the connection targets.

In this embodiment, the scanning is performed at the time that the display unit 24 is turned ON while the connection to the wireless LAN is ON, however the scanning may be performed at a different time point. For example, the scanning may be performed when the authentication unit 261-3 is activated while the connection to the wireless LAN is ON, or in a period after the display unit 24 is turned ON until the display unit 24 is turned OFF while the portable terminal is connected to the access point 3. Such an arrangement allows reduction of battery consumption. In addition, the time interval between the scanning sessions and the number of scanning times may be changed by the user or the system by modifying the setup file or the like. Such an arrangement allows the communication to be performed under various communication environments or the like.

Further, although the registration of the BSSID in the duplicate exclusion list and the registration of the ESSID in the isolation list are performed at different time points in this embodiment, the ESSID may be registered in the isolation list at the time that the BSSID is registered in the duplicate exclusion list. Likewise, although the initialization of the duplicate exclusion list and the initialization of the isolation list are performed at different time points in this embodiment, the duplicate exclusion list may be initialized at the time that the isolation list is initialized. With the mentioned arrangements, the disconnection from the excluded access point 3 as well as the initialization of the exclusion list and the target list can be more quickly performed.

Further, the exclusion list, the duplicate exclusion list, the target list, and the isolation list may be initialized, for example, when the connection to the wireless LAN is turned OFF, or when the number of excluded access points 3 registered exceeds an upper limit. The number of registered access points may be changed by the user or the system, by modifying the setup file or the like. With such arrangements, the storage unit 23-3 can be effectively utilized.

(Fifth Embodiment)

In the fourth embodiment, the scanning is performed at the predetermined time point, and the portable terminal re-registers the temporarily deleted network in the target list when the excluded access point is not detected. However, the excluded access point under a stealth setting is unable to be detected by the scanning, and hence the portable terminal may re-registers the temporarily deleted network in the target list despite the excluded access points being present in the network. In this embodiment, therefore, the portable terminal is restricted from performing the scanning in a predetermined period of time, when the predetermined network is temporarily deleted from the target list.

Figure 14:
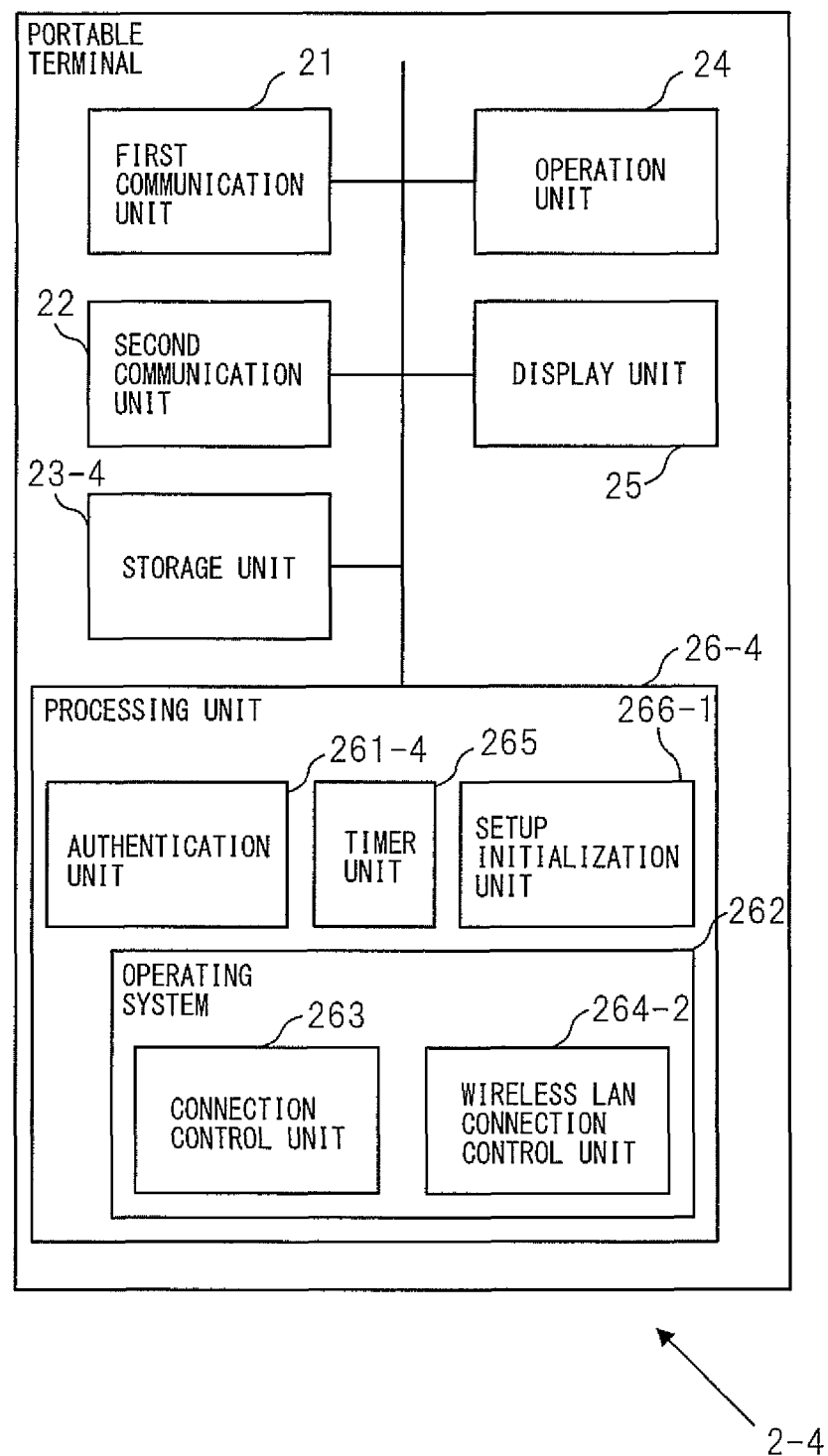
FIG. 14 is a view illustrating an example of the schematic configuration of a portable terminal according to a fifth embodiment.

FIG. 14 is a view illustrating an example of the schematic configuration of a portable terminal 2-4. In this configuration, the first communication unit 21, the second communication unit 22, the operation unit 24, the display unit 25, the operating system 262, the connection control unit 263, the wireless LAN connection control unit 264-2, and the timer unit 265 are the same as those depicted in FIG. 11, and therefore the description thereof will not be repeated.

The storage unit 23-4 stores therein, as the data, a restriction target list including the ESSID of the network the scanning of which is to be restricted, and a restriction period of the scanning, in addition to the data stored in the storage unit 23-3 depicted in FIG. 11.

The authentication unit 261-4 performs the web authentication with the gateway 5. The authentication unit 261-4 registers the BSSID of the access point 3 in the exclusion list and the duplicate exclusion list. The authentication unit 261-4 also deletes the ESSID of the network from the target list and registers the ESSID in the isolation list. Further, the authentication unit 261-3 requests the wireless LAN connection control unit 264-2 to cut off the connection to the access point 3. Further, the authentication unit 261-4 sets the restriction period for each network. To be more specific, when the BSSID of the access point 3 is registered in the duplicate exclusion list stored in the storage unit 23-4, the authentication unit 261-4 looks up the restriction target list stored in the storage unit 23-4 and determines whether the corresponding ESSID is registered. When the ESSID is registered, the authentication unit 261-4 acquires the restriction period from the storage unit 23-4, and instructs the timer unit 265 to start clocking using the restriction period as argument. When the ESSID is not registered, the authentication unit 261-4 instructs the timer unit 265 to start clocking using the restriction period of "0" as argument.

The setup initialization unit 266-1 initializes the settings related to the connection control. The setup initialization unit 266-1 also restricts the wireless LAN connection control unit 264-2 from performing the scanning during the restriction period. To be more detailed, when at least one BSSID is registered in the duplicate exclusion list stored in the storage unit 23-4, the setup initialization unit 266-1 instructs, at a predetermined time point, the timer unit 26 to make decision regarding the lapse of time. Upon receipt of a notice from the timer unit 265 to the effect that the restriction period has elapsed, the setup initialization unit 266-1 requests the wireless LAN connection control unit 264-2 to perform the scanning.

Figure 15:
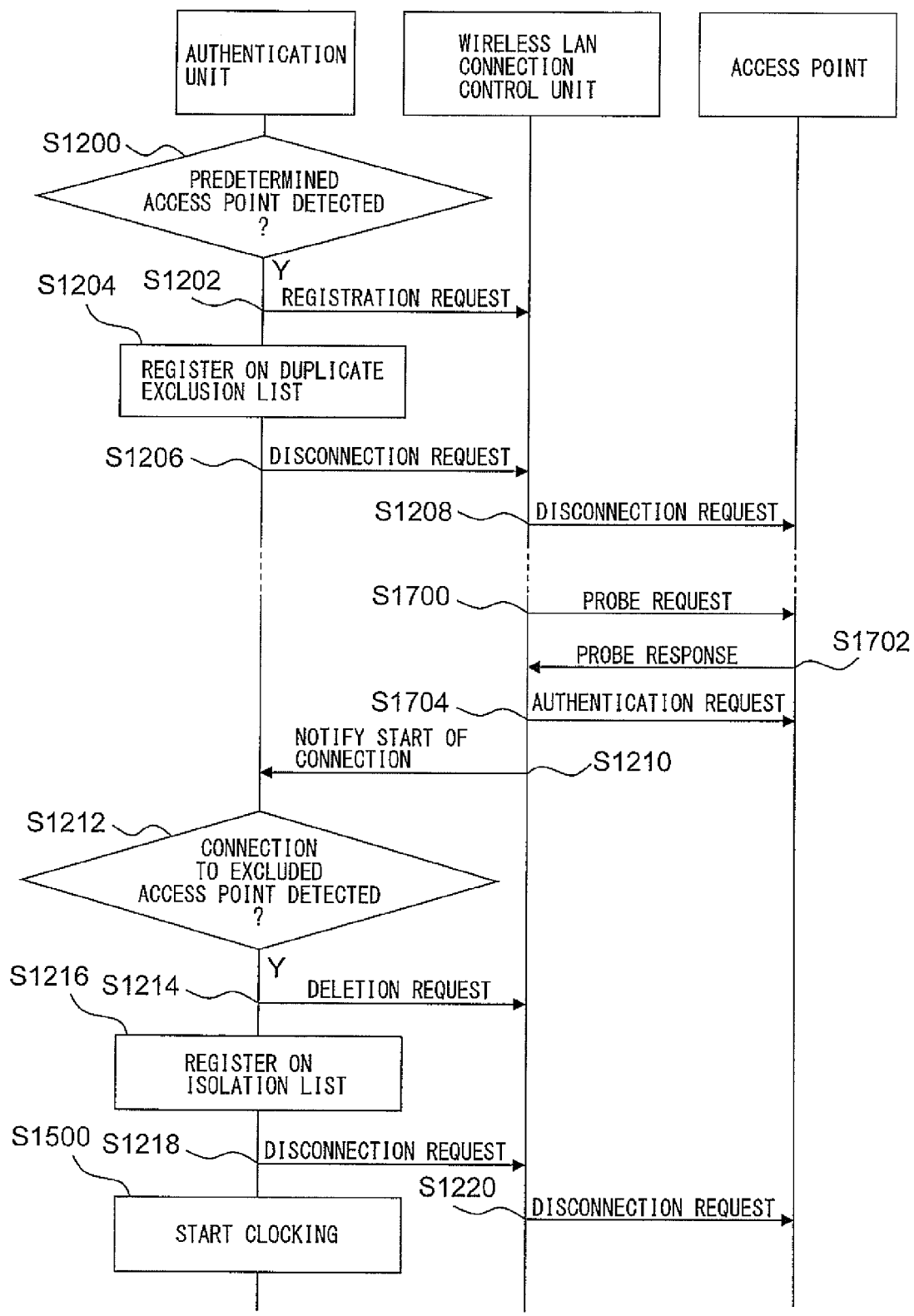
FIG. 15 is a view indicating an example of the operation sequence of the wireless communication system.

FIG. 15 is a view indicating an example of the operation sequence of the wireless communication system 1. Out of the operation sequence, steps S1200 to 1220, and steps S1700 to 1704 are the same as those included in FIG. 12, and therefore the description of those steps will not be repeated.

When the BSSID of the access point 3 is registered in the duplicate exclusion list stored in the storage unit 23-4, the authentication unit 261-4 looks up the restriction target list stored in the storage unit 23-4 and determines whether the corresponding ESSID is registered. When the ESSID is registered, the authentication unit 261-4 acquires the restriction period from the storage unit 23-4, and instructs the timer unit 265 to start clocking using the restriction period as argument (step S1500).

When the ESSID is not registered, the authentication unit 261-4 instructs the timer unit 265 to start clocking using the restriction period of "0" as argument (step S1500).

Figure 16:
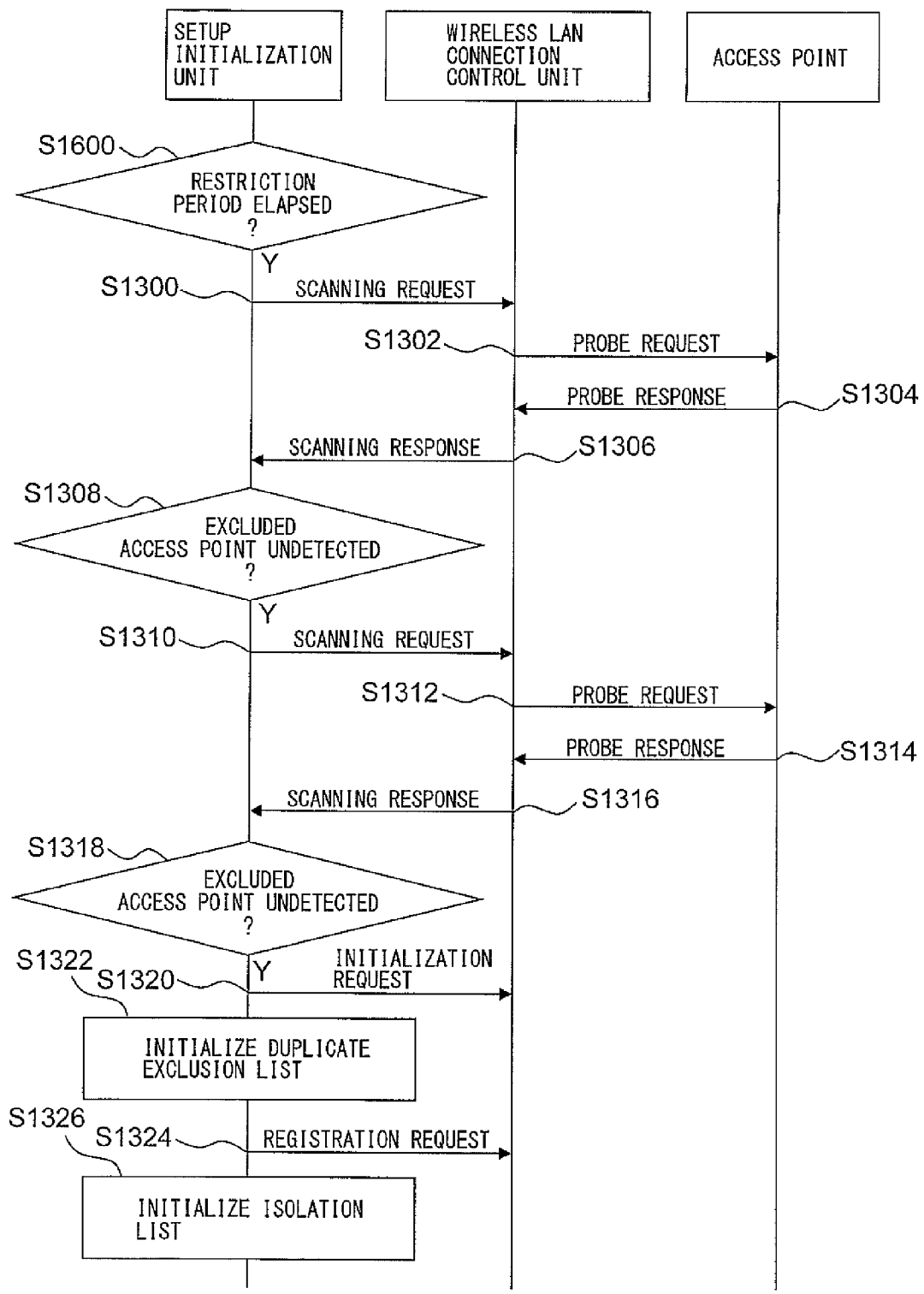
FIG. 16 is a view indicating an example of another operation sequence of the wireless communication system.

FIG. 16 is a view indicating an example of another operation sequence of the wireless communication system 1. Out of the operation sequence, steps S1302 to 1326 are the same as those included in FIG. 13, and therefore the description of those steps will not be repeated.

When at least one BSSID is registered in the duplicate exclusion list stored in the storage unit 23-4, the setup initialization unit 266-1 instructs, at a predetermined time point, the timer unit 26 to make decision regarding the lapse of time. Upon receipt of the notice from the timer unit 265 to the effect that the restriction period has elapsed (Yes at step S1600), the setup initialization unit 266-1 requests the wireless LAN connection control unit 264-2 to perform the scanning (step S1300).

As described above, the predetermined access point under the stealth setting can also be surely excluded from the connection targets, by restricting the wireless LAN connection control unit 264-2 from performing the scanning during the predetermined period of time when the predetermined network is temporarily deleted from the target list.

The present invention is not limited to this embodiment. For example, in this embodiment the scanning is restricted during the restriction period when the predetermined network is temporarily deleted from the target list. Alternatively, the temporarily deleted network may be restricted from being re-registered in the target list during the restriction period, when no excluded access point 3 is detected by the scanning. In this case also, the predetermined access point under the stealth setting can be surely excluded from the connection targets. In addition, the restriction period may be changed for a different network, or may be changed by the user or the system, by modifying the setup file or the like. Such arrangements allow the communication to be performed under various communication environments or the like.

It should be understood that various changes, substitutions, and modifications can be made herein by those skilled in the art without departing from the scope and spirit of the present invention.

REFERENCE SIGNS LIST

1 Wireless communication system
2 portable terminal
21 First communication unit
22 Second communication unit
23 Storage unit
24 Operation unit
25 Display unit
26 Processing unit
261 Authentication unit
262 Operating system
263 Connection control unit
264 Wireless LAN connection control unit
3 Access point
4 Backbone network
5 Gateway
6 Authentication server
7 Internet
8 Server
9 Base station
10 Mobile phone network

What is claimed is:

1. A terminal, which connects to a communication network, comprising:
    a communication module that connects to an access point of the communication network;
    a storage that stores a target list including networks to be connected to the terminal, an exclusion list including an excluding access point to be excluded from a plurality of connection targets, and a duplicate exclusion list that is a reproduction of the exclusion list;
    a connection controller that scans networks in the target list, detects access points of the scanned networks, and excludes the excluding access point in the exclusion list from the detected access points to identify a plurality of connectable access points for each of which a connection can be made; and
    a connection completion module that cuts off the connection to a first access point which is in process, and deletes a network in which the first access point is included from the target list, when a start of the connection to an access point in the duplicate exclusion list is detected, wherein
    the connection controller identifies a plurality of new access points to which a connection may be made after initializing the exclusion list, when the connection controller is unable to identify an access point to which a connection may be made, and designates one of the identified plurality of new access points to which a connection may be made as a target to connect to.

2. The terminal according to claim 1, wherein the connection completion module scans a given network, and registers a deleted network in the target list when the access point in the duplicate exclusion list is not detected.

3. The terminal according to claim 2, wherein the connection completion module does not scan a given network during a predetermined period of time when the deleted network is a predetermined network.

4. The terminal according to claim 1, further comprising a timer module that measure time,
    wherein the connection completion module performs communication with the communication network for a plurality of times to complete the connection to the communication network at an application level, causes the timer module to start measuring the time upon starting the connection to the communication network at the application level, and cuts off the connection to the access point upon determining, on the basis of the measured time by the timer module, that a predetermined timeout period has elapsed before completing the connection to the communication network at the application level.

5. The terminal according to claim 4, wherein the predetermined timeout period is specified according to the network that includes the access point in the communication network to which a connection has been established.

6. The terminal according to claim 1, further comprising a second communication module that connects to a second communication network of a different type from the communication network,
    wherein the connection completion module completes connection to the communication network at an application level, and wherein
    in cases a connection to the second communication network is already completed, the connection controller notifies the connection completion module that the connection to the communication network at a communication network level has been established, and switches the network for communication from the second communication network to the communication network, upon receipt of a notice of completion of the connection to the communication network at the application level, from the connection completion module.

7. The terminal according to claim 6, wherein the storage further stores a switching access point which is a switching delay target, from the access points in the communication network, and
    the connection controller immediately switches the network for communication from the second communication network to the communication network, when the access point of the communication network to which a connection is established is not the switching access point.

8. The terminal according to claim 7, wherein the connection controller allows communication with a server for completing the connection to the communication network to be performed through the communication network, in accordance with a request from the connection completion module.

9. The terminal according to claim 6, wherein the connection controller allows communication through the communication network with a server for completing the connection to the communication network, in accordance with a request from the connection completion module.

10. The terminal according to claim 9, wherein the server performs user authentication of the terminal, and wherein the connection to the communication network is completed when the user authentication by the server is completed.

11. A connection method to be executed by a terminal which connects to a communication network, the terminal comprising a storage that stores a target list including networks to be connected to the terminal, an exclusion list including an excluding access point to be excluded from a plurality of connection targets, and a duplicate exclusion list that is a reproduction of the exclusion list, the method comprising:
    scanning a network registered in the target list;
    detecting access points of the scanned networks;
    excluding the excluding access point in the exclusion list from the detected access points to identify a plurality of connectable access points for each of which a connection can be made;
    identifying a plurality of new access points to which a connection may be made after initializing the exclusion list, when an access point to which a connection may be made is unable to be identified;
    designating one of the identified plurality of new access points to which a connection may be made as a target to connect to; and
    cutting off the connection to a first access point which is in process, and deleting a network in which the first access point is included from the target fist, when a start of the connection to an access point in the duplicate exclusion list is detected.

* * * * *